United States Patent
Chung et al.

(10) Patent No.: US 11,139,727 B2
(45) Date of Patent: Oct. 5, 2021

(54) PERMANENT MAGNET ELECTRICAL MACHINE FOR REDUCING DETENT FORCE

(71) Applicant: KOREA ELECTROTECHNOLOGY RESEARCH INSTITUTE, Changwon (KR)

(72) Inventors: Shi Uk Chung, Changwon (KR); Jong Moo Kim, Changwon (KR)

(73) Assignee: KOREA ELECTROTECHNOLOGY RESEARCH INSTITUTE, Changwon (KR)

( * ) Notice: Subject to any disclaimer, the term of this patent is extended or adjusted under 35 U.S.C. 154(b) by 7 days.

(21) Appl. No.: 16/349,574

(22) PCT Filed: Dec. 21, 2017

(86) PCT No.: PCT/KR2017/015244
§ 371 (c)(1),
(2) Date: May 13, 2019

(87) PCT Pub. No.: WO2018/117690
PCT Pub. Date: Jun. 28, 2018

(65) Prior Publication Data
US 2020/0212773 A1    Jul. 2, 2020

(30) Foreign Application Priority Data

Dec. 23, 2016  (KR) .......................... 10-2016-0177567

(51) Int. Cl.
*H02K 1/17* (2006.01)
*H02K 29/03* (2006.01)
*H02K 41/03* (2006.01)

(52) U.S. Cl.
CPC .............. *H02K 29/03* (2013.01); *H02K 1/17* (2013.01); *H02K 41/031* (2013.01); *H02K 2213/03* (2013.01)

(58) Field of Classification Search
CPC ...... H02K 41/03; H02K 41/031; H02K 29/03; H02K 1/17; H02K 2213/03
(Continued)

(56) References Cited

U.S. PATENT DOCUMENTS 4,315,171 A * 2/1982 Schaeffer ............... H02K 41/03
310/216.109
4,424,463 A * 1/1984 Musil ..................... H02K 21/22
310/186

(Continued)

FOREIGN PATENT DOCUMENTS

CN    101958633 A    1/2011
CN    102931803 A    2/2013
(Continued)

OTHER PUBLICATIONS

International Search Report issued in related PCT application No. PCT/KR2017/015244 dated Mar. 30, 2018.
(Continued)

*Primary Examiner* — Burton S Mullins

(57) ABSTRACT

The present invention relates to a permanent magnet electrical machine, and more particularly, to a permanent magnet electrical machine for reducing a detent force, the machine being capable of reducing a detent force by arranging a plurality of movers having the same teeth at predetermined intervals. In addition, according to the present invention, the permanent magnet electrical machine comprising a stator and a plurality of movers configured to perform linear motion, curvilinear motion, or rotary motion with respect to the stator is provided.

13 Claims, 20 Drawing Sheets

(58) Field of Classification Search
USPC .................................................. 310/12.18
See application file for complete search history.

(56) References Cited

U.S. PATENT DOCUMENTS

| | | | | |
|---|---|---|---|---|
| 5,642,013 | A * | 6/1997 | Wavre | H02K 1/146 310/216.112 |
| 6,407,471 | B1 * | 6/2002 | Miyamoto | H02K 41/03 29/596 |
| 6,476,524 | B1 * | 11/2002 | Miyamoto | H02K 41/031 310/12.19 |
| 7,170,202 | B2 * | 1/2007 | Watarai | H02K 41/03 310/12.25 |
| 7,321,176 | B2 * | 1/2008 | Strothmann | H02K 1/146 310/156.15 |
| 8,102,085 | B2 * | 1/2012 | Jajtic | B23B 29/125 310/12.22 |
| 2006/0012252 | A1 * | 1/2006 | Miyata | H02K 41/031 310/12.18 |
| 2006/0125338 | A1 | 6/2006 | Groening et al. | |
| 2009/0322162 | A1 | 12/2009 | Jajtic et al. | |
| 2013/0076159 | A1 * | 3/2013 | Chung | H02K 21/16 310/12.18 |
| 2014/0062223 | A1 | 3/2014 | Park et al. | |

FOREIGN PATENT DOCUMENTS

| | | |
|---|---|---|
| CN | 103227552 A | 7/2013 |
| CN | 104410245 A | 3/2015 |
| CN | 106411096 A | 2/2017 |
| KR | 20100113290 A | 10/2010 |
| KR | 20110001465 A | 1/2011 |
| KR | 20110120156 A | 11/2011 |
| KR | 10100092212 B1 | 12/2011 |
| KR | 20130121291 A | 11/2013 |
| WO | WO0223702 A1 | 3/2002 |

OTHER PUBLICATIONS

Notification of Second Office Action dated Jun. 30, 2021 issued in related Chinese Patent Application No. 201780065505.8.

* cited by examiner

PERMANENT MAGNET ELECTRICAL MACHINE FOR REDUCING DETENT FORCE

CROSS-REFERENCE TO RELATED APPLICATIONS

The present application is a National Phase of International Application No. PCT/KR2017/015244 filed on Dec. 21, 2017, which claims priority to Korean Patent Application No. 10-2016-0177567 filed on Dec. 23, 2016 in the Korean Intellectual Property Office.

BACKGROUND OF THE INVENTION

Field of the Invention

The present invention relates to a permanent magnet electrical machine, and more particularly, to a permanent magnet electrical machine for reducing a detent force, which is capable of reducing a detent force by arranging a plurality of movers having the same tooth structure at predetermined intervals.

Background of the Invention

Generally, a permanent magnet electrical machine includes a mover having teeth provided linearly and repeatedly, and a stator having N poles and S poles periodically arranged repeatedly. In recent years, the permanent magnet electrical machine has been widely used for those requiring linear motion.

In the permanent magnet electrical machine, the relative positions between the magnetic poles of the mover having the teeth and the stator are changed according to the movement of the mover or the stator. Thus, the force acting between the tooth of the mover and the permanent magnet is repeatedly balanced and unbalanced.

For this reason, in the permanent magnet electrical machine, the forward or reverse thrust is generated even when no current is applied to the winding of the mover. This is referred to as a detent force.

The detent force causes a ripple of the thrust due to the linear motion of the permanent magnet electrical machine, which hinders smooth motion and causes mechanical vibration and noise during the motion of the permanent magnet electrical machine.

The detent force largely consists of a cogging force generated in the slot (or tooth) of the mover and an end force generated at both ends of the mover.

In this regard, a permanent magnet electrical machine widely used in the past has a structure that increases thrust by continuously connecting movers.

The permanent magnet electrical machine according to the related art still has a thrust ripple due to the end effect.

CITATION LIST

Patent Literature (Patent Literature 1) Korean Patent Application Publication No. 10-2011-0120156
(Patent Literature 2) Korean Patent Application Publication No. 10-2010-0113290
(Patent Literature 3) Korean Patent Application Publication No. 10-2011-0001465

BRIEF SUMMARY OF THE INVENTION

The present invention has been made in an effort to solve the above problems and provides a permanent magnet electrical machine for reducing a detent force, which is capable of reducing a detent force by arranging a plurality of movers having the same tooth structure at predetermined intervals.

According to an aspect of the present invention, a permanent magnet electrical machine comprises a stator; and a plurality of movers configured perform linear motion, curvilinear motion, or rotary motion with respect to the stator, the plurality of movers including a first mover and a second mover, wherein an interval between a last teeth of the first mover and a first teeth of the second mover adjacent to the first mover is $\alpha+\gamma$, $\alpha$, which is a tooth arrangement interval of a mover, is $\alpha=m\tau_p/s$, and $\gamma$, which is a weighted value, is $\gamma=\tau_p/n$, herein m is the number of magnetic poles of the stator, s is the number of teeth of the mover, $\tau_p$ is a pole pitch, and n is the number of phases the electrical machine; the respective mover has teeth, which are d times of 3 and are arranged at predetermined intervals, and phase windings wound around the teeth, herein d is a natural number of 2 or more; and the stator includes a plurality of magnetic poles having polarities alternating with respect to an iron core.

When the number of the magnetic poles of the stator is m and the number of slots of the mover is s, the length $L_{mover}$ of the mover may be $L_{mover}=m\tau_p$ and the teeth arrangement interval a of the mover may be $\alpha=m\tau_p/s$.

When the number m of magnetic poles of the stator is 5 and the number s of slots of the mover is 6, phase windings of the first mover may include U, /U, /V, V, W, and /W phases in sequence, and phase windings of the second mover may include W, /W, /U, U, V, and N phases in sequence, wherein U and /U, V and /V, and W and /W have different current directions.

When the number m of magnetic poles of the stator is 7 and the number s of slots of the mover is 6, phase windings of the first mover may include U, /U, /V, V, W, and /W phases, and phase windings of the second mover may include V, /V, /W, W, U, and /U phases, wherein U and /U, V and /V, and W and /W have different current directions.

When the number m of magnetic poles of the stator is 7 and the numbers of slots of the mover is 9, phase windings of the first mover may include U, V, W, /W, /U, /V, V, W, and U phases, and phase windings of the second mover may include W, U, V, /V, /W, /U, U, V, and W phases, wherein U and /U, V and /V, and W and /W have different current directions.

When the number m of magnetic poles of the stator is 8 and the number s of slots of the mover is 9, phase windings of the first mover may include U, /U, U, V, /V, V, W, /W, and W phases, and phase windings of the second mover may include /W, W, /W, /U, U, /U, /V, V, and /V phases, wherein U and /U, V and /V, and W and /W have different current directions.

When the number m of magnetic poles of the stator is 10 and the numbers of slots of the mover is 9, phase windings of the first mover may include U, /U, U, V, /V, V, W, /W, and W phases, and phase windings of the second mover may include N, V, /V, /W, W, /W, /U, U, and /U phases, wherein U and /U, V and /V, and W and /W have different current directions.

When the number m of magnetic poles of the stator is 11 and the number s of slots of the mover is 12, phase windings of the first mover may include U, U, /U, /V, V, /V, V, W, /W, W, and /W phases, and phase windings of the second mover may include W, /W, W, /W, /U, U, /U, U, V, /V, V, and /V phases, wherein U and /U, V and /V, and W and /W have different current directions.

When the number m of magnetic poles of the stator is 13 and the number s of slots of the mover is 12, phase windings of the first mover may include U, /U, U, /U, /V, V, /V, V, W, /W, W, and /W phases, and phase windings of the second mover may include V, /V, V, /V, /W, W, /W, W, U, /U, U, and /U phases, wherein U and /U, V and /V, and W and /W have different current directions.

When the number m of magnetic poles of the stator is 10 and the numbers of slots of the mover is 12, phase windings of the first mover may include U, /U, /V, V, W, /W, /U, U, V, /V, /W, and W phases, and phase windings of the second mover may include /W, W, U, /U, /V, V, W, /W, /U, U, V, and N phases, wherein U and /U, V and N, and W and /W have different current directions.

According to another aspect of the present invention, a permanent magnet electrical machine comprises a stator; and a plurality of movers configured to face the stator and perform linear motion, curvilinear motion, or rotary motion, wherein an interval between a last teeth of a first mover of the plurality of movers and a first teeth of a second mover of the plurality of movers adjacent to the first mover is α+γ, α, which is a teeth arrangement interval of a mover, is $\alpha = m\tau_p/s$, and γ, which is a weighted value, is $\gamma = \tau_p/n$, herein m is the number of magnetic poles of the stator, s is the number of teeth of the mover, $\tau_p$ is a pole pitch, and n is the number of phases of the electrical machine; the respective mover has teeth, which are d times of 3 and are arranged at predetermined intervals, and phase windings alternately wound around the respective teeth, herein d is a natural number of 2 or more, and p=t/2 when the number of teeth is t and the number of phase windings is p; and the stator includes a plurality of magnetic poles having polarities alternating with respect to an iron core.

When the number of the magnetic poles of the stator is m and the number of slots of the mover is s, the length $L_{mover}$ of the mover may be $L_{mover} = m\tau_p$ and the teeth arrangement interval α of the mover may be $\alpha = m\tau_p/s$.

When the number m of magnetic poles of the stator is 5 and the number s of slots of the mover is 6, phase windings of the first mover may include /U, V, and /W phases, and phase windings of the second mover may include /W, U, and /V phases or W, /U, and V phases, wherein U and /U, V and /V, and W and /W have different current directions.

When the number m of magnetic poles of the stator is 7 and the number s of slots of the mover is 6, phase windings of the first mover may include /U, V, and /W phases, and phase windings of the second mover may include /V, W, and /U phases or V, /W, and U phases, wherein U and /U, V and /V, and W and /W have different current directions.

When the number m of magnetic poles of the stator is 11 and the numbers of slots of the mover is 12, phase windings of the first mover may include /U, /U, V, V, /W, and /W phases, and phase windings of the second mover may include /W, /W, U, U, /V, and /V phases or W, W, /U, /U, V, and V phases, wherein U and /U, V and /V, and W and /W have different current directions.

When the number m of magnetic poles of the stator is 13 and the number s of slots of the mover is 12, phase windings of the first mover may include /U, /U, V, V, /W, and /W phases, and phase windings of the second mover may include /V, N, W, W, /U, and /U phase or V, V, /W, /W, U, and U phases, wherein U and /U, V and N, and W and /W have different current directions.

When the number m of magnetic poles of the stator is 10 and the numbers of slots of the mover is 12, phase windings of the first mover may include /U, V, /W, U, /V, and W phases, and phase windings of the second mover may include W, /U, V, /W, U, and /V phases or /W, U, /V, W, /U, and V phases, wherein U and /U, V and /V, and W and /W have different current directions.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, exemplary embodiments of the present invention will be described in detail with reference to the accompanying drawings.

The following embodiments are provided for helping comprehensive understanding of methods, apparatuses, and/or systems described herein. However, this is merely an example and the present invention is not limited thereto.

Also, while describing the present invention, detailed descriptions about related well-known functions or configurations that may diminish the clarity of the points of the present invention are omitted. The terms used herein are those general terms currently widely used in the art in consideration of functions in regard to the present invention, but the terms may vary according to the intention of those of ordinary skill in the art, precedents, or new technology in the art. The terms used in the present specification are merely used to describe particular embodiments, and are not intended to limit the present invention. An expression used in the singular encompasses the expression in the plural, unless it has a clearly different meaning in the context. In the present specification, it is to be understood that terms such as "including" or "having", etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

It will be understood that although the terms "first", "second", etc. may be used herein to describe various components, these components should not be limited by these terms. These components are only used to distinguish one component from another.

Figure 1:
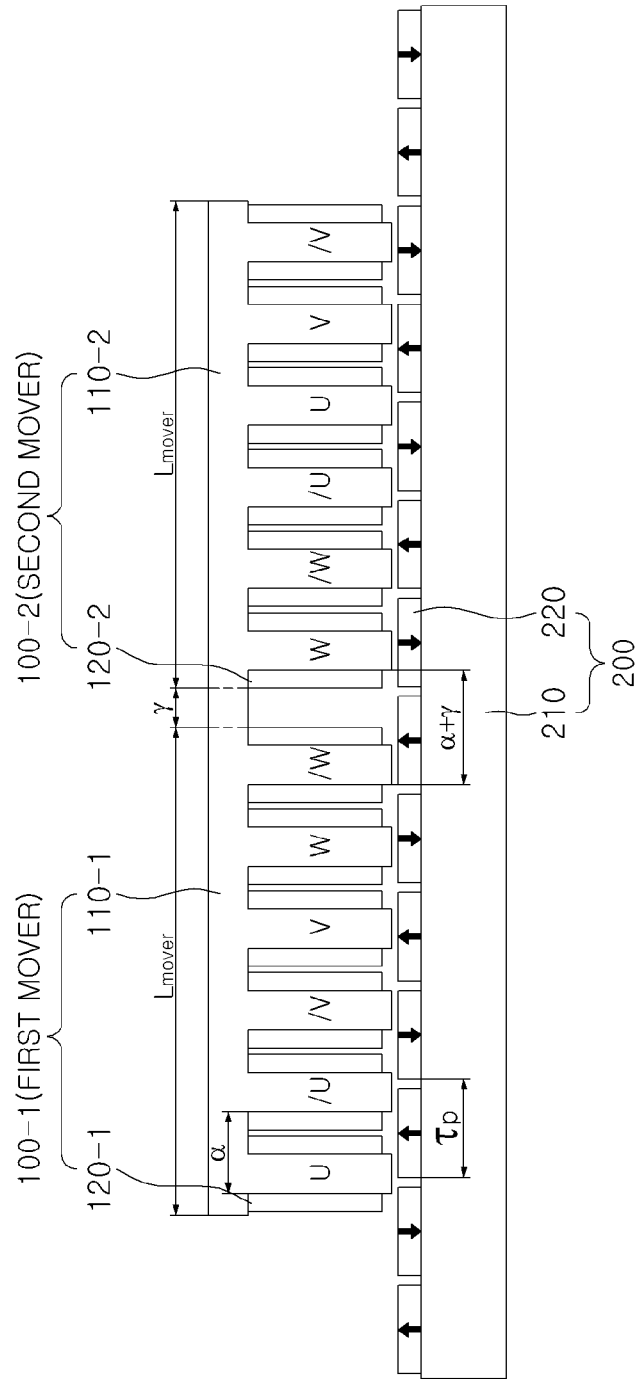
FIG. 1 illustrates a permanent magnet electrical machine having five permanent magnets and six mover slots and driven by a three-phase power source, according to a preferred embodiment of the present invention.
Figure 2:
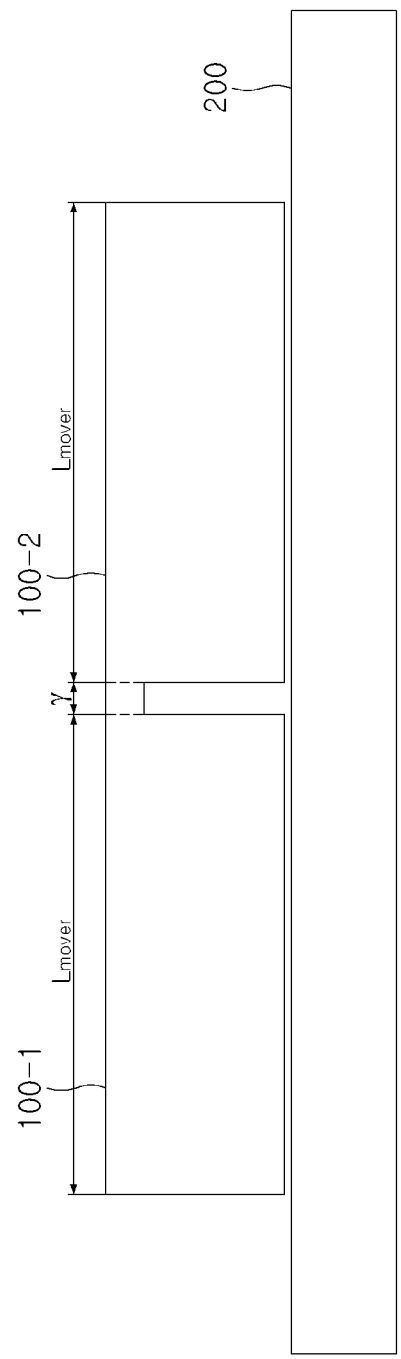
FIG. 2 is a simplified diagram of FIG. 1.

FIG. 1 illustrates a permanent magnet electrical machine having five permanent magnets and six mover slots and driven by a three-phase power source, according to a preferred embodiment of the present invention, and FIG. 2 is a simplified diagram of FIG. 1.

FIGS. 1 and 2 are diagrams for describing the overall structure of the permanent magnet electrical machine and the arrangement of a first mover 100-1 and a second mover 100-2, which linearly move with respect to a stator 200.

Figure 3:
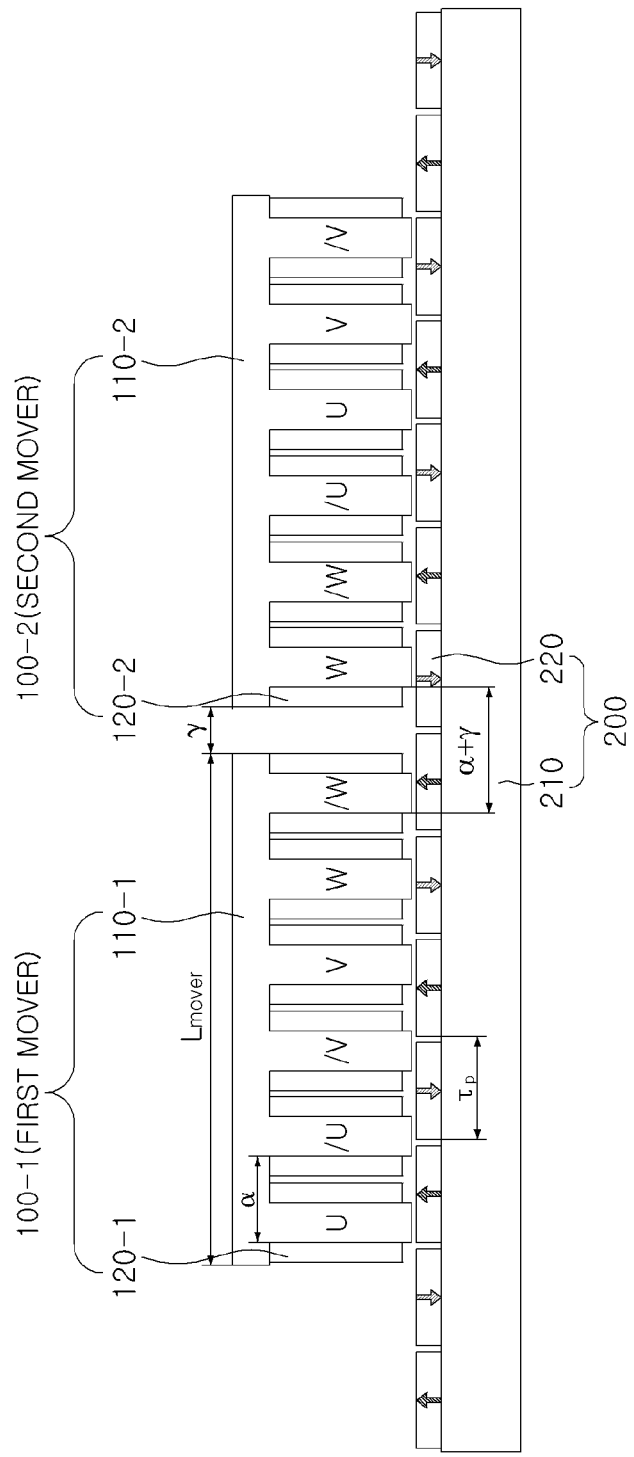
FIG. 3 illustrates a permanent magnet electrical machine having five permanent magnets and six mover slots and driven by a three-phase power source, in which the movers of the permanent magnet electrical machine are separated from each other, according to a preferred embodiment of the present invention.
Figure 4:
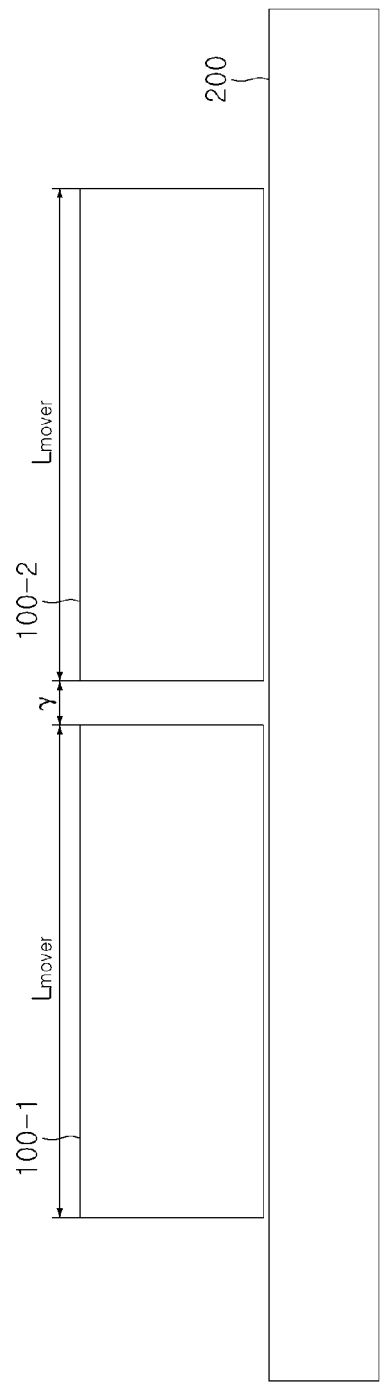
FIG. 4 is a simplified diagram of FIG. 3.

Although the first mover 100-1 and the second mover 100-2 are connected to form one iron core, the first mover 100-1 and the second mover 100-2 may be spaced from each other as illustrated in FIGS. 3 and 4. The first mover 100-1 and the second mover 100-2 are disposed face to face with the stator 200.

At this time, as indicated by a dashed line in FIG. 1, a connecting portion between the first mover 100-1 and the second mover 100-2 extend by a weighted value (or weight) γ.

In this regard, FIG. 3 illustrates a permanent magnet electrical machine having five permanent magnets and six mover slots and driven by a three-phase power source (or a three-phase power supply), according to a preferred embodiment of the present invention, and FIG. 4 is a simplified diagram of FIG. 3. Unlike in FIGS. 1 and 2, the first mover 100-1 and the second mover 100-2 are physically spaced apart from each other by a weighted value γ.

Referring to FIGS. 1 to 4, the permanent magnet electrical machine having five permanent magnets and six mover slots and driven by the three-phase power source, according to the preferred embodiment of the present invention, includes a first mover 100-1 having first phase windings 120-1 on a first mover iron core 110-1 having teeth of a multiple of 3, a second mover 100-2 having second phase windings 120-2 on a second mover iron core 110-2 having teeth of a multiple of 3, and a stator 200 having permanent magnets 220 disposed on a straight stator iron core 210 having no teeth, wherein the permanent magnet 220 is arranged to have a magnetic polarity opposite to that of an adjacent permanent magnet. Although the arrangement of the permanent magnets has been described, it can be expressed as the arrangement of magnetic poles as the generic concept.

Referring to FIGS. 1 and 2, the interval between the adjacent teeth of the adjacent movers 100-1 and 100-2 is α+γ, wherein α, which is the tooth arrangement interval of the mover, is α=mτ$_p$/s, and γ, which is a weighted value, is γ=τ$_p$/n, where m is the number of magnetic poles of the stator, s is the number of teeth of the mover, τ$_p$ is a pole pitch, and n is the number of phases of the electrical machine.

In FIGS. 3 and 4, the first mover iron core 110-1 of the first mover 100-1 and the second mover iron core 110-2 of the second mover 100-2 are spaced apart from each other by a weighted value γ (=τ$_p$/n, where τ$_p$ is the pole pitch and n is the number of phases of the electrical machine).

Referring to FIGS. 1 to 4, the first phase windings 120-1 of the first mover 100-1 include U, /U, /V, V, W, and /W phases, and the second phase windings 120-2 of the second mover 100-2 include W, /W, /U, U, V, and /V phases.

U and /U, V and /V, and W and /W have different current directions (i.e. have an electrical phase difference of 180°).

The weighted value corresponding to the interval between the first mover iron core 110-1 of the first mover 100-1 and the second mover iron core 110-2 of the second mover 100-2 has, for example, an electrical phase angle of 60° (=τ$_p$/3) when the number of phases n of the electrical machine is 3.

The first mover iron core 110-1 of the first mover 100-1 and the second mover iron core 110-2 of the second mover 100-2 have six (multiple of 3) teeth arranged at equal intervals a respectively. That is, when the number of teeth of the first mover iron core 110-1 of the first mover 100-1 and the second mover iron core 110-2 of the second mover 100-2 is t, t=3d, where d is a natural number of 2 or more, and d=2 in FIGS. 1 and 3.

U, V, and W of the phase windings 120-1 and 120-2 of the first mover 100-1 and the second mover 100-2 have an electrical phase difference of 120°.

When the lengths of the first mover 100-1 and the second mover 100-2 are L$_{mover}$, L$_{mover}$=5τ$_p$ and the tooth arrangement interval is α=5τ$_p$/6.

That is, when the lengths of the first mover 100-1 and the second mover 100-2 are L$_{mover}$, the number of poles is m, and the number of slots is s, $L_{mover}=m\tau_p$ and the tooth arrangement interval is $\alpha=m\tau_p/s$.

Figure 5:
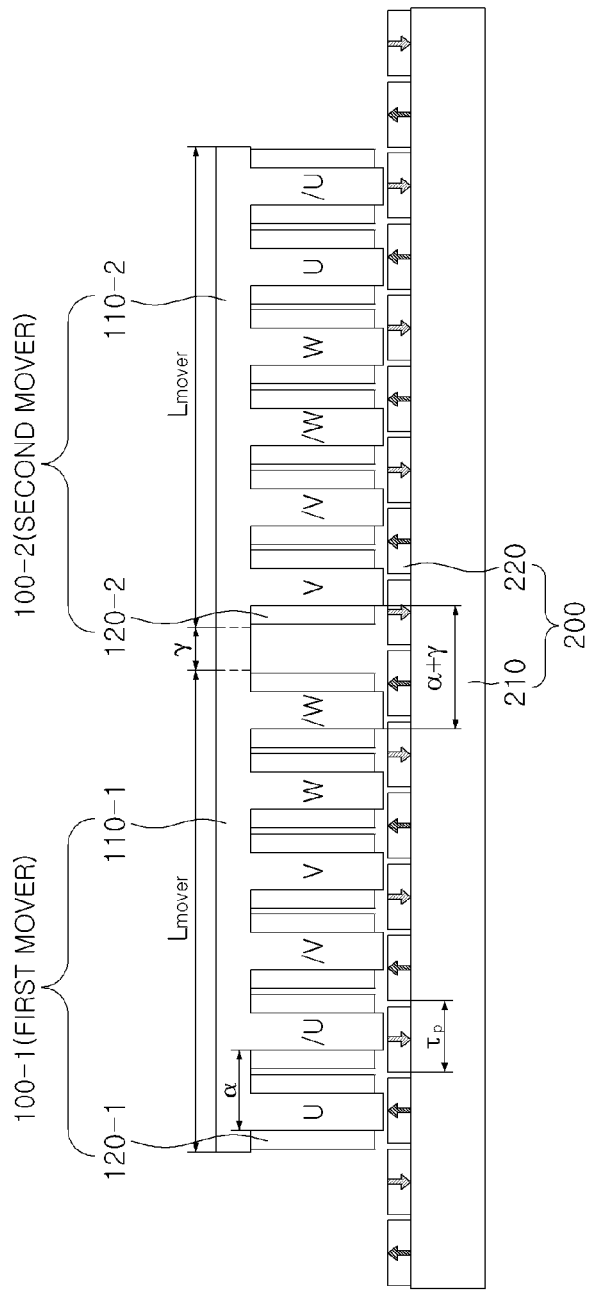
FIG. 5 illustrates a permanent magnet electrical machine having seven permanent magnets and six mover slots and driven by a three-phase power source, according to another preferred embodiment of the present invention.

FIG. 5 illustrates a permanent magnet electrical machine having seven permanent magnets and six mover slots and driven by the three-phase power source, according to another preferred embodiment of the present invention, and is a diagram for describing the overall structure of the permanent magnet electrical machine and the arrangement of a first mover 100-1 and a second mover 100-2 which linearly move with respect to a stator 200.

Referring to FIG. 5, the permanent magnet electrical machine having seven permanent magnets and six mover slots and driven by the three-phase power source, according to another preferred embodiment of the present invention, includes a first mover 100-1 having first phase windings 120-1 on a first mover iron core 110-1 having teeth of a multiple of 3, a second mover 100-2 having second phase windings 120-2 on a second mover iron core 110-2 having teeth of a multiple of 3, and a stator 200 having permanent magnets 220 disposed on a straight stator iron core 210 having no stator teeth, wherein the permanent magnet 220 is arranged to have a magnetic polarity opposite to that of an adjacent permanent magnet.

Although the first mover 100-1 and the second mover 100-2 are connected to form one iron core, the first mover 100-1 and the second mover 100-2 may be spaced from each other. The first mover 100-1 and the second mover 100-2 are disposed face to face with the stator 200.

At this time, as indicated by a dashed line in FIG. 5, a connecting portion between the first mover 100-1 and the second mover 100-2 extend by a weighted value γ.

The interval between the adjacent teeth of the adjacent movers 100-1 and 100-2 is α+γ, wherein α, which is the tooth arrangement interval of the mover, is $\alpha=m\tau_p/s$, and γ, which is a weighted value, is $\gamma=\tau_p/n$, where m is the number of magnetic poles of the stator, s is the number of teeth of the mover, $\tau_p$ is a pole pitch, and n is the number of phases of the electrical machine.

When the first mover 100-1 and the second mover 100-2 are spaced apart from each other, the first mover iron core 110-1 of the first mover 100-1 and the second mover iron core 110-2 of the second mover 100-2 are spaced apart from each other by a weighted value γ ($=\tau_p/n$, where $\tau_p$ is a pole pitch and n is the number of phases of the electrical machine).

The first phase windings 120-1 of the first mover 100-1 include U, /U, /V, V, W, and /W phases, and the second phase windings 120-2 of the second mover 100-2 include V, /V, /W, W, U, and /U phases.

The weighted value corresponding to the interval between the first mover 100-1 and the second mover 100-2 has, for example, an electrical phase angle of 60° ($=\tau_p/3$) when the number of phases n of the electrical machine is 3.

The first mover 100-1 and the second mover 100-2 have six (multiple of 3) teeth arranged at equal intervals a (that is, d=2) respectively.

U, V, and W of the phase windings 120-1 and 120-2 of the first mover 100-1 and the second mover 100-2 have an electrical phase difference of 120°.

When the lengths of the first mover 100-1 and the second mover 100-2 are $L_{mover}$, $L_{mover}=7\tau_p$ (m=7) and the tooth arrangement interval is $\alpha=7\tau_p/6$ (m=7, s=6).

Figure 6:
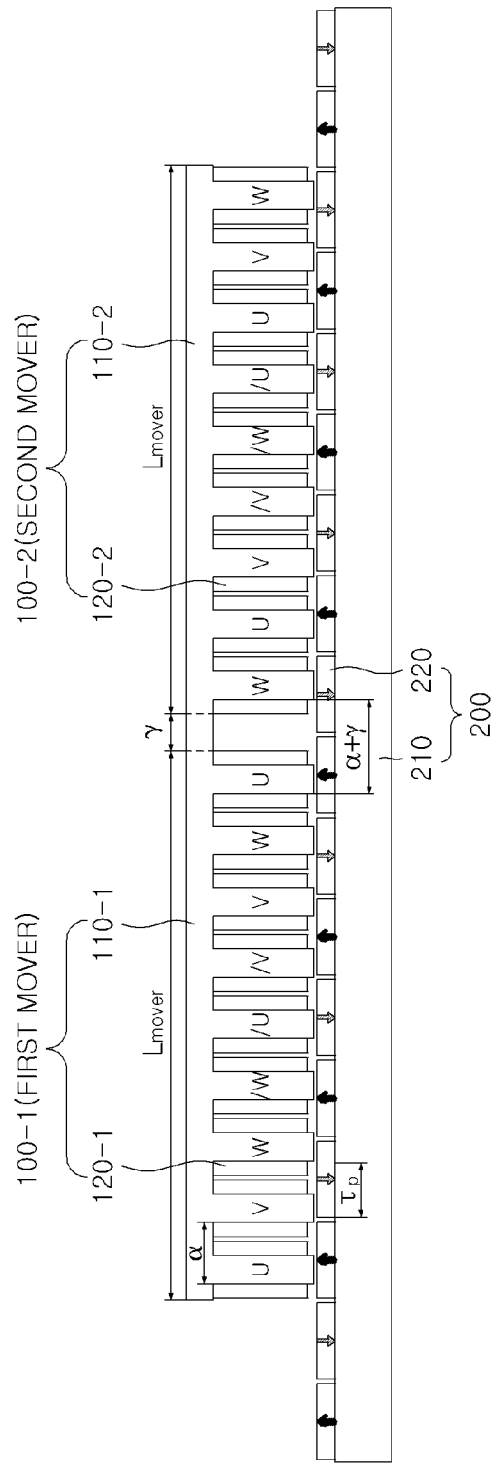
FIG. 6 illustrates a permanent magnet electrical machine source having seven permanent magnets and nine mover slots and driven by a three-phase power, according to another preferred embodiment of the present invention.

FIG. 6 illustrates a permanent magnet electrical machine having seven permanent magnets and nine mover slots and driven by the three-phase power source, according to another preferred embodiment of the present invention, and is a diagram for describing the overall structure of the permanent magnet electrical machine and the arrangement of a first mover 100-1 and a second mover 100-2 which linearly move with respect to a stator 200.

Referring to FIG. 6, the permanent magnet electrical machine having seven permanent magnets and nine mover slots and driven by the three-phase power source, according to another preferred embodiment of the present invention, includes a first mover 100-1 having first phase windings 120-1 on a first mover iron core 110-1 having teeth of a multiple of 3, a second mover 100-2 having second phase windings 120-2 on a second mover iron core 110-2 having teeth of a multiple of 3, and a stator 200 having permanent magnets 220 disposed on a straight stator iron core 210 having no stator teeth, wherein the permanent magnet 220 is arranged to have a magnetic polarity opposite to that of an adjacent permanent magnet.

Although the first mover 100-1 and the second mover 100-2 are connected to form one iron core, the first mover 100-1 and the second mover 100-2 may be spaced from each other.

At this time, as indicated by a dashed line in FIG. 6, a connecting portion between the first mover 100-1 and the second mover 100-2 extend by a weighted value γ.

The interval between the adjacent teeth of the adjacent movers 100-1 and 100-2 is α+γ, wherein α, which is the tooth arrangement interval of the mover, is $\alpha=m\tau_p/s$, and γ, which is a weighted value, is $\gamma=\tau_p/n$, where m is the number of magnetic poles of the stator, s is the number of teeth of the mover, $\tau_p$ is a pole pitch, and n is the number of phases of the electrical machine.

When the first mover 100-1 and the second mover 100-2 are spaced apart from each other, the first mover iron core 110-1 of the first mover 100-1 and the second mover iron core 110-2 of the second mover 100-2 are spaced apart from each other by a weighted value γ ($=\tau_p/n$, where $\tau_p$ is a pole pitch and n is the number of phases of the electrical machine).

The first mover 100-1 includes U, V, W, /W, /U, /V, V, W, and U phases, and the second mover 100-2 includes W, U, V, N, /W, /U, U, V, and W phases.

The weighted value corresponding to the interval between the first mover 100-1 and the second mover 100-2 has an electrical phase angle of 60° ($=\tau_p/3$), for example, when the number of phases n of the electrical machine is 3.

The first mover 100-1 and the second mover 100-2 have nine teeth arranged at equal intervals a (that is d=3) respectively.

U, V, and W of the phase windings 120-1 and 120-2 of the first mover 100-1 and the second mover 100-2 have an electrical phase difference of 120°.

When the lengths of the first mover 100-1 and the second mover 100-2 are $L_{mover}$, $L_{mover}=7\tau_p$ (m=7) and the tooth arrangement interval is $\alpha=7\tau_p/9$ (m=7, s=9).

Figure 7:
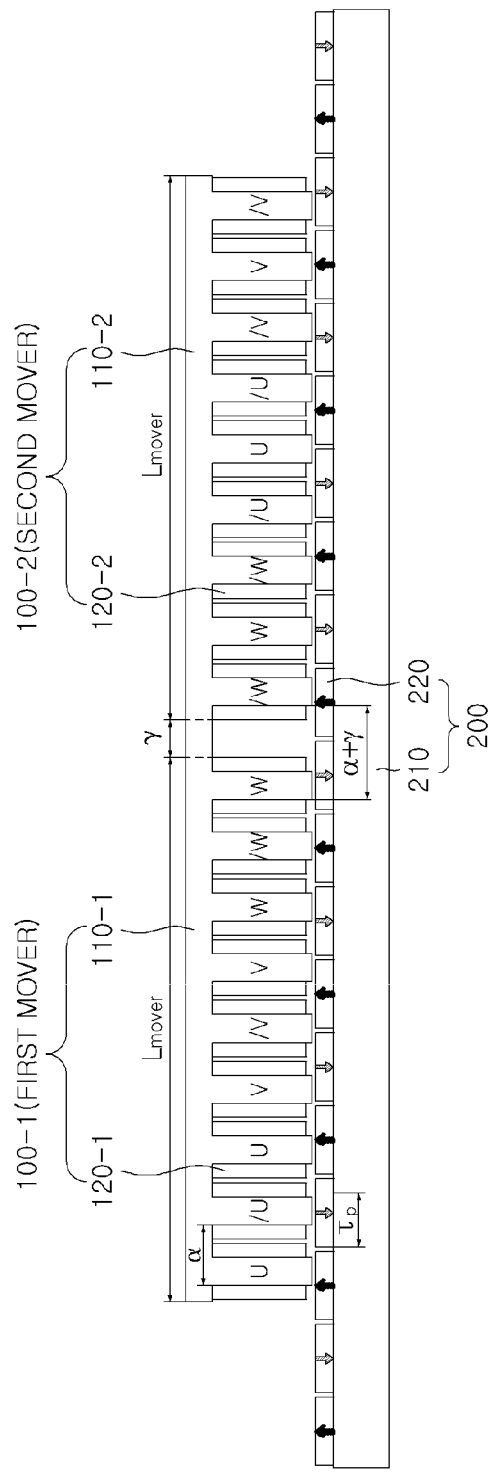
FIG. 7 illustrates a permanent magnet electrical machine having eight permanent magnets and nine mover slots and driven by a three-phase power source, according to another preferred embodiment of the present invention.

FIG. 7 illustrates a permanent magnet electrical machine having eight permanent magnets and nine mover slots and driven by the three-phase power source, according to another preferred embodiment of the present invention, and is a diagram for describing the overall structure of the permanent magnet electrical machine and the arrangement of a first mover 100-1 and a second mover 100-2 which linearly move with respect to a stator 200.

Referring to FIG. 7, the permanent magnet electrical machine having eight permanent magnets and nine mover slots and driven by the three-phase power source, according to another preferred embodiment of the present invention, includes a first mover 100-1 having first phase windings 120-1 on a first mover iron core 110-1 having teeth of a multiple of 3, a second mover 100-2 having second phase windings 120-2 on a second mover iron core 110-2 having teeth of a multiple of 3, and a stator 200 having permanent magnets 220 disposed on a straight stator iron core 210 having no stator teeth, wherein the permanent magnet 220 is arranged to have a magnetic polarity opposite to that of an adjacent permanent magnet.

Although the first mover 100-1 and the second mover 100-2 are connected to form one iron core, the first mover 100-1 and the second mover 100-2 may be spaced from each other.

At this time, as indicated by a dashed line in FIG. 7, a connecting portion between the first mover 100-1 and the second mover 100-2 extend by a weighted value $\gamma$.

The interval between the adjacent teeth of the adjacent movers 100-1 and 100-2 is $\alpha+\gamma$, wherein $\alpha$, which is the tooth arrangement interval of the mover, is $\alpha=m\tau_p/s$, and $\gamma$, which is a weighted value, is $\gamma=\tau_p/n$, where m is the number of magnetic poles of the stator, s is the number of teeth of the mover, $\tau_p$ is a pole pitch, and n is the number of phases of the electrical machine.

When the first mover 100-1 and the second mover 100-2 are spaced apart from each other, the first mover iron core 110-1 of the first mover 100-1 and the second mover iron core 110-2 of the second mover 100-2 are spaced apart from each other by a weighted value $\gamma$ ($=\tau_p/n$, where $\tau_p$ is a pole pitch and n is the number of phases of the electrical machine).

The first mover 100-1 includes U, /U, U, V, /V, V, W, /W, and W phases, and the second mover 100-2 includes /W, W, /W, /U, U, /U, /V, V, and /V phases.

The weighted value corresponding to the interval between the first mover 100-1 and the second mover 100-2 has, for example, an electrical phase angle of 60° ($=\tau_p/3$) when the number of phases n of the electrical machine is 3.

The first mover 100-1 and the second mover 100-2 have nine teeth arranged at equal intervals a (that is d=3) respectively.

U, V, and W of the phase windings 120-1 and 120-2 of the first mover 100-1 and the second mover 100-2 have an electrical phase difference of 120°.

When the lengths of the first mover 100-1 and the second mover 100-2 are $L_{mover}$, $L_{mover}=8\tau_p$ (m=8) and the tooth arrangement interval is $\alpha=8\tau_p/9$ (m=8, s=9).

Figure 8:
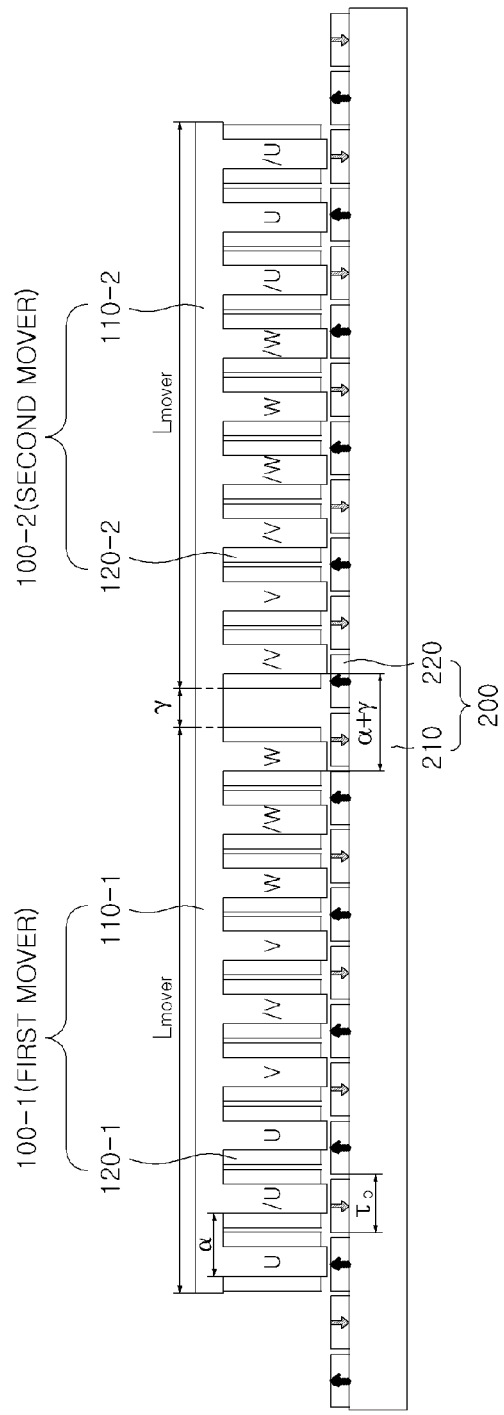
FIG. 8 illustrates a permanent magnet electrical machine having ten permanent magnets and nine mover slots and driven by a three-phase power source, according to another preferred embodiment of the present invention.

FIG. 8 illustrates a permanent magnet electrical machine having ten permanent magnets and nine mover slots and driven by the three-phase power source, according to another preferred embodiment of the present invention, and is a diagram for describing the overall structure of the permanent magnet electrical machine and the arrangement of a first mover 100-1 and a second mover 100-2 which linearly move with respect to a stator 200.

Referring to FIG. 8, the permanent magnet electrical machine having ten permanent magnets and nine mover slots and driven by the three-phase power source, according to another preferred embodiment of the present invention, includes a first mover 100-1 having first phase windings 120-1 on a first mover iron core 110-1 having teeth of a multiple of 3, a second mover 100-2 having second phase windings 120-2 on a second mover iron core 110-2 having teeth of a multiple of 3, and a stator 200 having permanent magnets 220 disposed on a straight stator iron core 210 having no stator teeth, wherein the permanent magnet 220 is arranged to have a magnetic polarity opposite to that of an adjacent permanent magnet.

Although the first mover 100-1 and the second mover 100-2 are connected to form one iron core, the first mover 100-1 and the second mover 100-2 may be spaced from each other.

At this time, as indicated by a dashed line in FIG. 8, a connecting portion between the first mover 100-1 and the second mover 100-2 extend by a weighted value $\gamma$.

The interval between the adjacent teeth of the adjacent movers 100-1 and 100-2 is $\alpha+\gamma$, wherein $\alpha$, which is the tooth arrangement interval of the mover, is $\alpha=m\tau_p/s$, and $\gamma$, which is a weighted value, is $\gamma=\tau_p/n$, where m is the number of magnetic poles of the stator, s is the number of teeth of the mover, $\tau_p$ is a pole pitch, and n is the number of phases of the electrical machine.

When the first mover 100-1 and the second mover 100-2 are spaced apart from each other, the first mover iron core 110-1 of the first mover 100-1 and the second mover iron core 110-2 of the second mover 100-2 are spaced apart from each other by a weighted value $\gamma$ ($=\tau_p/n$, where $\tau_p$ is a pole pitch and n is the number of phases of the electrical machine).

The first mover 100-1 includes U, /U, U, V, /V, V, W, /W, and W phases, and the second mover 100-2 includes /V, V, /V, /W, W, /W, /U, U, and /U phases.

The weighted value corresponding to the interval between the first mover 100-1 and the second mover 100-2 has, for example, an electrical phase angle of 60° ($=\tau_p/3$) when the number of phases n of the electrical machine is 3.

The first mover 100-1 and the second mover 100-2 have nine teeth arranged at equal intervals a (that is d=3) respectively.

U, V, and W of the phase windings 120-1 and 120-2 of the first mover 100-1 and the second mover 100-2 have an electrical phase difference of 120°.

When the lengths of the first mover 100-1 and the second mover 100-2 are $L_{mover}$, $L_{mover}=10\tau_p$ (m=10) and the tooth arrangement interval is $\alpha=10\tau_p/9$ (m=10, s=9).

Figure 9:
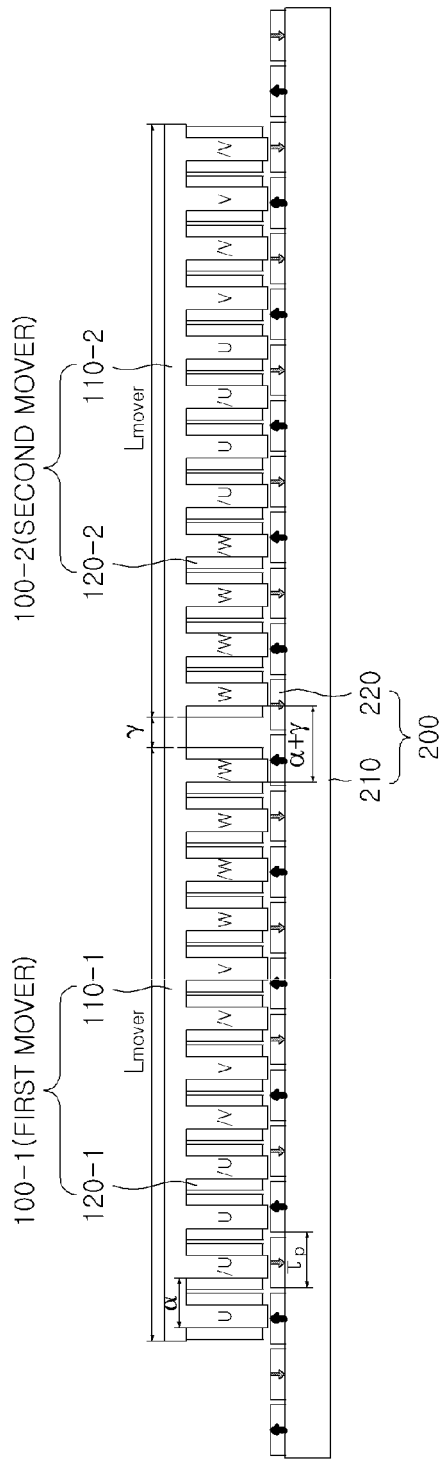
FIG. 9 illustrates a permanent magnet electrical machine having eleven permanent magnets and twelve mover slots and driven by a three-phase power source, according to another preferred embodiment of the present invention.

FIG. 9 illustrates a permanent magnet electrical machine having eleven permanent magnets and twelve mover slots and driven by the three-phase power source, according to another preferred embodiment of the present invention, and is a diagram for describing the overall structure of the permanent magnet electrical machine and the arrangement of a first mover 100-1 and a second mover 100-2 which linearly move with respect to a stator 200.

Referring to FIG. 9, the permanent magnet electrical machine having eleven permanent magnets and twelve mover slots and driven by the three-phase power source, according to another preferred embodiment of the present invention, includes a first mover 100-1 having first phase windings 120-1 on a first mover iron core 110-1 having teeth of a multiple of 3, a second mover 100-2 having second phase windings 120-2 on a second mover iron core 110-2 having teeth of a multiple of 3, and a stator 200 having permanent magnets 220 disposed on a straight stator iron core 210 having no stator teeth, wherein the permanent magnet 220 is arranged to have a magnetic polarity opposite to that of an adjacent permanent magnet.

Although the first mover 100-1 and the second mover 100-2 are connected to form one iron core, the first mover 100-1 and the second mover 100-2 may be spaced from each other.

At this time, as indicated by a dashed line in FIG. 9, a connecting portion between the first mover 100-1 and the second mover 100-2 extend by a weighted value $\gamma$.

The interval between the adjacent teeth of the adjacent movers 100-1 and 100-2 is $\alpha+\gamma$, wherein $\alpha$, which is the tooth arrangement interval of the mover, is $\alpha=m\tau_p/s$, and $\gamma$, which is a weighted value, is $\gamma=\tau_p/n$, where m is the number of magnetic poles of the stator, s is the number of teeth of the mover, $\tau_p$ is a pole pitch, and n is the number of phases of the electrical machine.

When the first mover 100-1 and the second mover 100-2 are spaced apart from each other, the first mover iron core 110-1 of the first mover 100-1 and the second mover iron core 110-2 of the second mover 100-2 are spaced apart from each other by a weighted value $\gamma$ $(=\tau_p/n$, where $\tau_p$ is a pole pitch and n is the number of phases of the electrical machine).

The first mover 100-1 includes U, /U, U, /U, /V, V, /V, V, W, /W, W, and /W phases, and the second mover 100-2 includes W, /W, W, /W, /U, U, /U, U, V, /V, V, and /V phases.

The weighted value corresponding to the interval between the first mover 100-1 and the second mover 100-2 has an electrical phase angle of 60° $(=\tau_p/3)$, for example, when the number of phases n of the electrical machine is 3.

The first mover 100-1 and the second mover 100-2 have twelve teeth arranged at equal intervals a (that is d=4) respectively.

U, V, and W of the phase windings 120-1 and 120-2 of the first mover 100-1 and the second mover 100-2 have an electrical phase difference of 120°.

When the lengths of the first mover 100-1 and the second mover 100-2 are $L_{mover}$, $L_{mover}=11\tau_p$ (m=11) and the tooth arrangement interval is $\alpha=11\tau_p/12$ (m=11, s=12).

Figure 10:
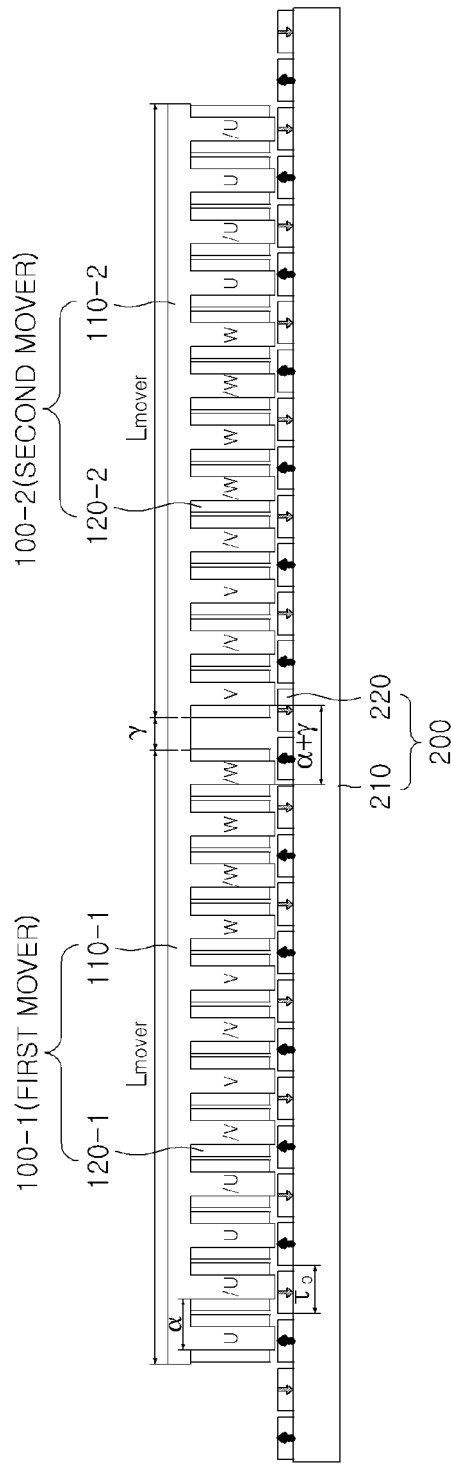
FIG. 10 illustrates a permanent magnet electrical machine having thirteen permanent magnets and twelve mover slots and driven by a three-phase power source, according to another preferred embodiment of the present invention.

FIG. 10 illustrates a permanent magnet electrical machine having thirteen permanent magnets and twelve mover slots and driven by the three-phase power source, according to another preferred embodiment of the present invention, and is a diagram for describing the overall structure of the permanent magnet electrical machine and the arrangement of a first mover 100-1 and a second mover 100-2 which linearly move with respect to a stator 200.

Referring to FIG. 10, the permanent magnet electrical machine having thirteen permanent magnets and twelve mover slots and driven by the three-phase power source, according to another preferred embodiment of the present invention, includes a first mover 100-1 having first phase windings 120-1 on a first mover iron core 110-1 having teeth of a multiple of 3, a second mover 100-2 having second phase windings 120-2 on a second mover iron core 110-2 having teeth of a multiple of 3, and a stator 200 having permanent magnets 220 disposed on a straight stator iron core 210 having no stator teeth, wherein the permanent magnet 220 is arranged to have a magnetic polarity opposite to that of an adjacent permanent magnet.

Although the first mover 100-1 and the second mover 100-2 are connected to form one iron core, the first mover 100-1 and the second mover 100-2 may be spaced from each other.

At this time, as indicated by a dashed line in FIG. 10, a connecting portion between the first mover 100-1 and the second mover 100-2 extend by a weighted value $\gamma$.

The interval between the adjacent teeth of the adjacent movers 100-1 and 100-2 is $\alpha+\gamma$, wherein $\alpha$, which is the tooth arrangement interval of the mover, is $\alpha=m\tau_p/s$, and $\gamma$, which is a weighted value, is $\gamma=\tau_p/n$, where m is the number of magnetic poles of the stator, s is the number of teeth of the mover, $\tau_p$ is a pole pitch, and n is the number of phases of the electrical machine.

When the first mover 100-1 and the second mover 100-2 are spaced apart from each other, the first mover iron core 110-1 of the first mover 100-1 and the second mover iron core 110-2 of the second mover 100-2 are spaced apart from each other by a weighted value $\gamma$ $(=\tau_p/n$, where $\tau_p$ is a pole pitch and n is the number of phases of the electrical machine).

The first mover 100-1 includes U, /U, U, /U, /V, V, /V, V, W, /W, W, and /W phases, and the second mover 100-2 includes V, /V, V, /V, /W, W, /W, W, U, /U, U, and /U phases.

The weighted value corresponding to the interval between the first mover 100-1 and the second mover 100-2 has, for example, an electrical phase angle of 60° $(=\tau_p/3)$ when the number of phases n of the electrical machine is 3.

The first mover 100-1 and the second mover 100-2 have twelve teeth arranged at equal intervals a (that is d=4) respectively.

U, V, and W of the phase windings 120-1 and 120-2 of the first mover 100-1 and the second mover 100-2 have an electrical phase difference of 120°.

When the lengths of the first mover 100-1 and the second mover 100-2 are $L_{mover}$, $L_{mover}=13\tau_p$ (m=13) and the tooth arrangement interval is $\alpha=13\tau_p/12$ (m=13, s=12).

Figure 11:
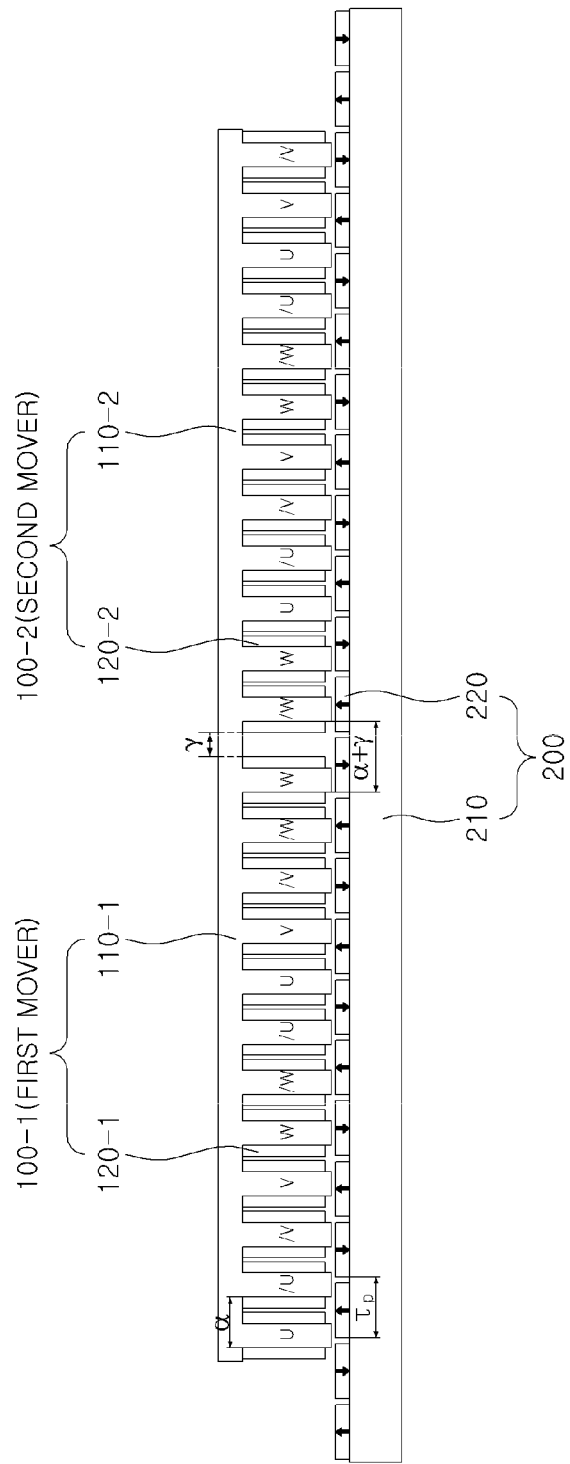
FIG. 11 illustrates a permanent magnet electrical machine having ten permanent magnets and twelve mover slots and driven by a three-phase power source, according to another preferred embodiment of the present invention.

FIG. 11 illustrates a permanent magnet electrical machine having ten permanent magnets and twelve mover slots and driven by the three-phase power source, according to another preferred embodiment of the present invention, and is a diagram for describing the overall structure of the permanent magnet electrical machine and the arrangement of a first mover 100-1 and a second mover 100-2 which linearly move with respect to a stator 200.

Referring to FIG. 11, the permanent magnet electrical machine having ten permanent magnets and twelve mover slots and driven by the three-phase power source, according to another preferred embodiment of the present invention, includes a first mover 100-1 having first phase windings 120-1 on a first mover iron core 110-1 having teeth of a multiple of 3, a second mover 100-2 having second phase windings 120-2 on a second mover iron core 110-2 having teeth of a multiple of 3, and a stator 200 having permanent magnets 220 disposed on a straight stator iron core 210 having no stator teeth, wherein the permanent magnet 220 is arranged to have a magnetic polarity opposite to that of an adjacent permanent magnet.

Although the first mover 100-1 and the second mover 100-2 are connected to form one iron core, the first mover 100-1 and the second mover 100-2 may be spaced from each other.

At this time, as indicated by a dashed line in FIG. 11, a connecting portion between the first mover 100-1 and the second mover 100-2 extend by a weighted value $\gamma$.

The interval between the adjacent teeth of the adjacent movers 100-1 and 100-2 is $\alpha+\gamma$, wherein $\alpha$, which is the tooth arrangement interval of the mover, is $\alpha=m\tau_p/s$, and $\gamma$, which is a weighted value, is $\gamma=\tau_p/n$, where m is the number of magnetic poles of the stator, s is the number of teeth of the mover, $\tau_p$ is a pole pitch and n is the number of phases of the electrical machine.

When the first mover 100-1 and the second mover 100-2 are spaced apart from each other, the first mover iron core 110-1 of the first mover 100-1 and the second mover iron core 110-2 of the second mover 100-2 are spaced apart from each other by a weighted value $\gamma$ $(=\tau_p/n$, where $\tau_p$ is a pole pitch and n is the number of phases of the electrical machine).

The first mover 100-1 includes U, /U, N, V, W, /W, /U, U, V, /V, /W, and W phases, and the second mover 100-2 includes /W, W, U, /U, /V, V, W, /W, /U, U, V, and /V phases.

The weighted value corresponding to the interval between the first mover 100-1 and the second mover 100-2 has, for example, an electrical phase angle of 60° (=$\tau_p/3$) when the number of phases n of the electrical machine is 3.

The first mover 100-1 and the second mover 100-2 have twelve teeth arranged at equal intervals a (that is d=4) respectively.

U, V, and W of the phase windings 120-1 and 120-2 of the first mover 100-1 and the second mover 100-2 have an electrical phase difference of 120°.

When the lengths of the first mover 100-1 and the second mover 100-2 are $L_{mover}$, $L_{mover}$=$10\tau_A$ (m=10) and the tooth arrangement interval is $\alpha$=$10\tau_p/12$ (m=10, s=12).

FIGS. 12 to 16 are diagrams illustrating that the embodiments of FIGS. 1 to 11 can be used not only in a double layer winding but also in a single layer winding.

Figure 12:
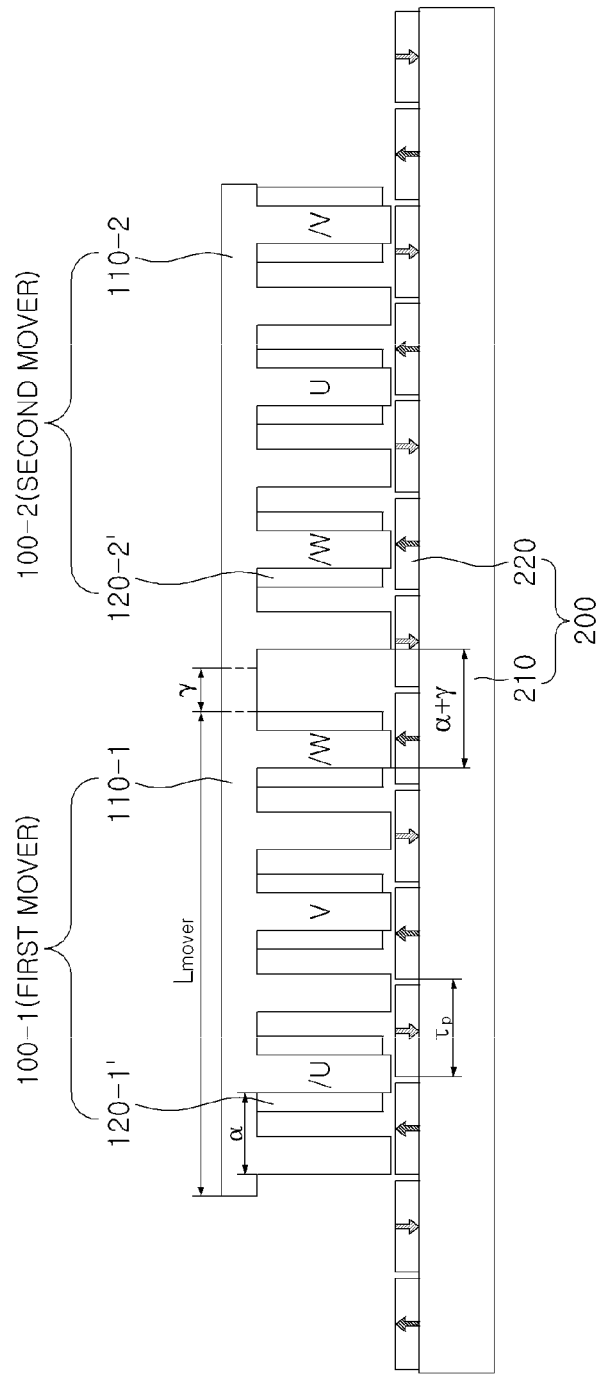
FIG. 12 is a diagram designed to change a double layer winding of FIG. 1 into a single layer winding.

FIG. 12 is a diagram designed to change the double layer winding of FIG. 1 into a single layer winding. The number of the permanent magnets and the number of the mover slots are the same as those in FIG. 1. However, the number of first phase windings 120-1' provided in the first mover iron core 110-1 is ½ of the number of the first phase windings 120-1 in FIG. 1. Similarly, the number of second phase windings 120-2' provided in the second mover iron core 110-2 is ½ of the number of the second phase windings 120-2 in FIG. 1.

The first phase windings 120-1' of the first mover 100-1 are /U, V, and /W phases in sequence, and the second phase windings 120-2' of the second mover 100-2 are /W, U, and /V phases in sequence. Although not illustrated, the second phase windings 120-2' of the second mover 100-2 may include W, /U, and V phases in sequence.

Figure 13:
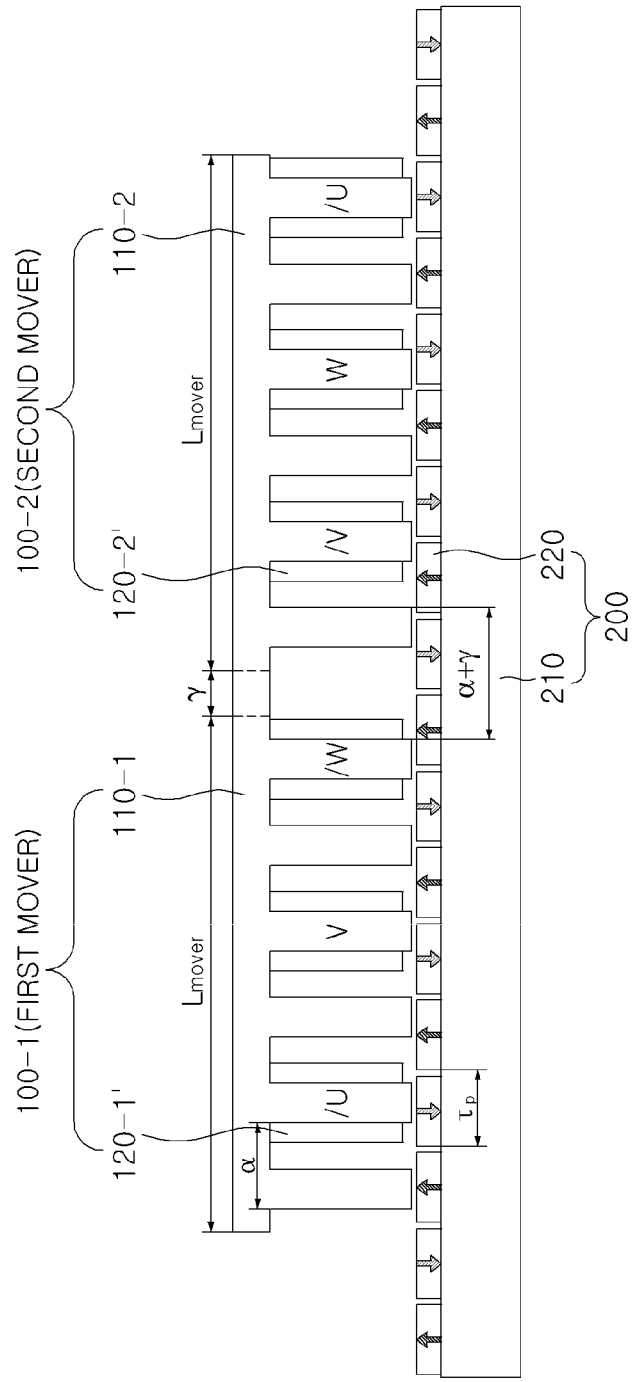
FIG. 13 is a diagram designed to change a double layer winding of FIG. 5 into a single layer winding.

FIG. 13 is a diagram designed to change the double layer winding of FIG. 5 into a single layer winding. The number of the permanent magnets and the number of the mover slots are the same as those in FIG. 5. However, the number of first phase windings 120-1' provided in the first mover iron core 110-1 is ½ of the number of the first phase windings 120-1 in FIG. 5. Similarly, the number of second phase windings 120-2' provided in the second mover iron core 110-2 is ½ of the number of the second phase windings 120-2 in FIG. 5.

The first phase windings 120-1' of the first mover 100-1 are /U, V, and /W phases, and the second phase windings 120-2' of the second mover 100-2 are /V, W, and /U phases. Although not illustrated, the second phase windings 120-2' of the second mover 100-2 may include V, /W, and U phases.

Figure 14:
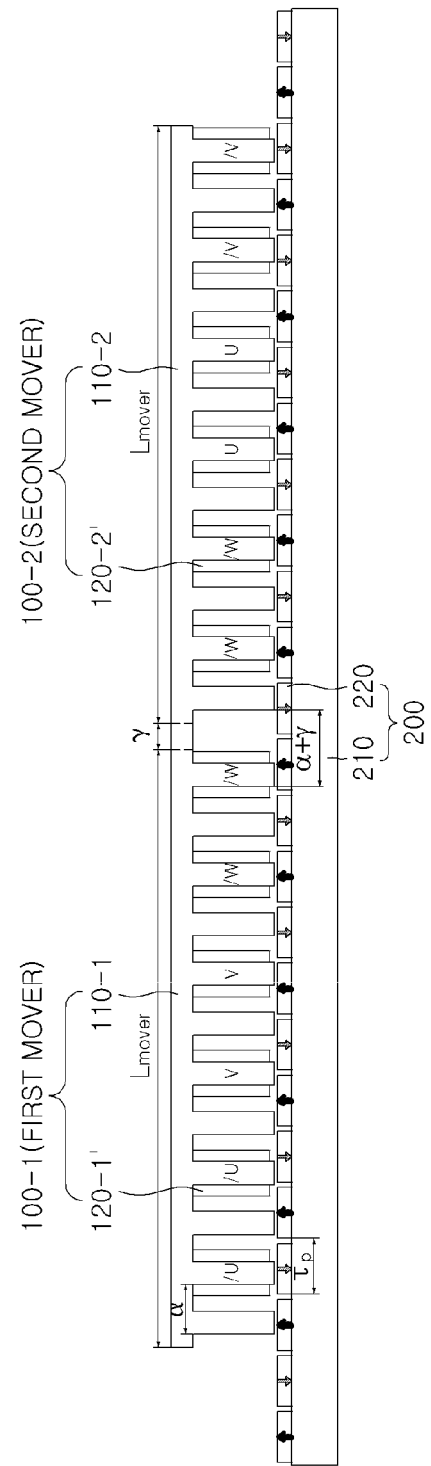
FIG. 14 is a diagram designed to change a double layer winding of FIG. 9 into a single layer winding.

FIG. 14 is a diagram designed to change the double layer winding of FIG. 9 into a single layer winding. The number of the permanent magnets and the number of the mover slots are the same as those in FIG. 9. However, the number of first phase windings 120-1' provided in the first mover iron core 110-1 is ½ of the number of the first phase windings 120-1 in FIG. 9. Similarly, the number of second phase windings 120-2' provided in the second mover iron core 110-2 is ½ of the number of the second phase windings 120-2 in FIG. 9.

The first mover 100-1 includes /U, /U, V, V, /W, and /W phases, and the second mover 100-2 includes /W, /W, U, U, /V, and /V phases. Although not illustrated, the second phase windings 120-2' of the second mover 100-2 may include W, W, /U, /U, V, and V phases.

Figure 15:
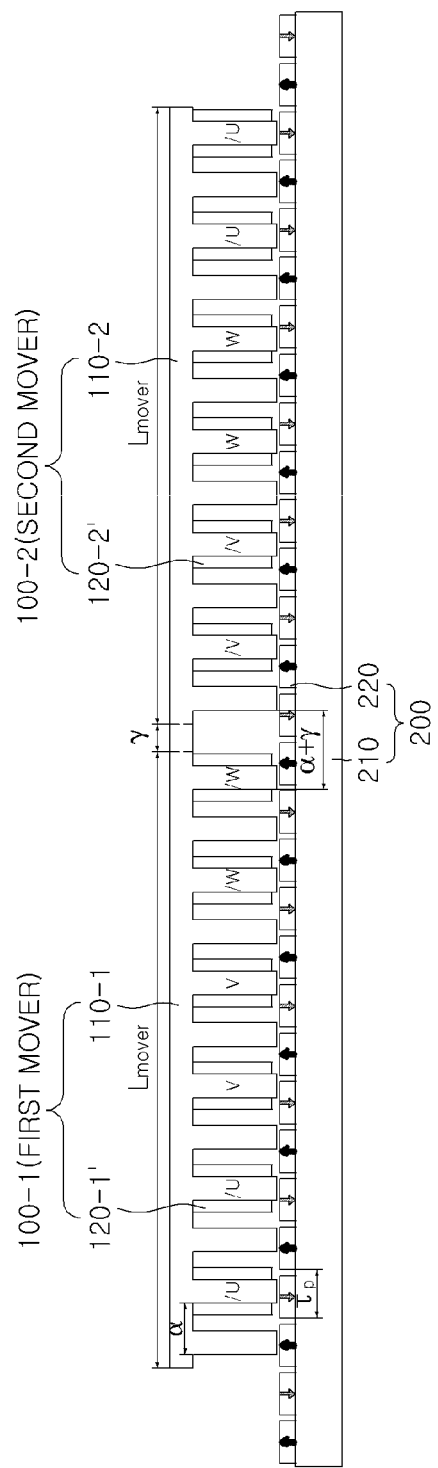
FIG. 15 is a diagram designed to change a double layer winding of FIG. 10 into a single layer winding.

FIG. 15 is a diagram designed to change the double layer winding of FIG. 10 into a single layer winding. The number of the permanent magnets and the number of the mover slots are the same as those in FIG. 10. However, the number of first phase windings 120-1' provided in the first mover iron core 110-1 is ½ of the number of the first phase windings 120-1 in FIG. 10. Similarly, the number of second phase windings 120-2' provided in the second mover iron core 110-2 is ½ of the number of the second phase windings 120-2 in FIG. 10.

The first mover 100-1 includes /U, /U, V, V, /W, and /W phases, and the second mover 100-2 includes /V, /V, W, W, /U, and /U phases. Although not illustrated, the second phase windings 120-2' of the second mover 100-2 may include V, V, /W, /W, U, and U phases.

Figure 16:
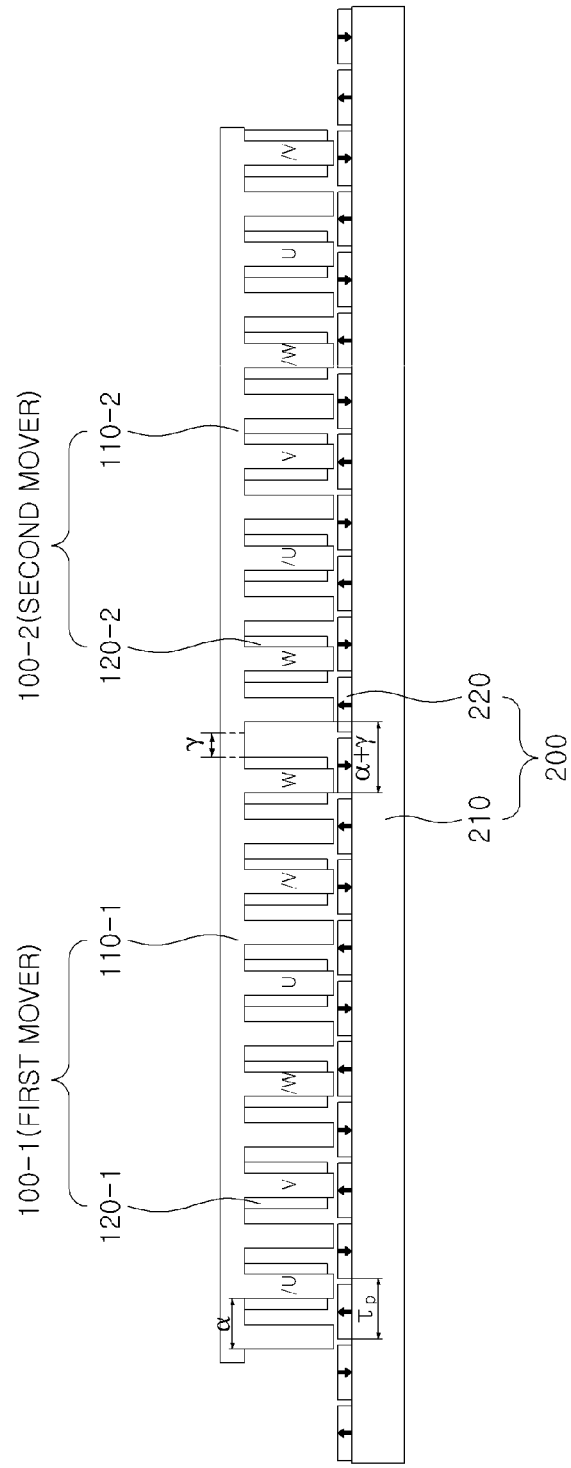
FIG. 16 is a diagram designed to change a double layer winding of FIG. 11 into a single layer winding.

FIG. 16 is a diagram designed to change the double layer winding of FIG. 11 into a single layer winding. The number of the permanent magnets and the number of the mover slots are the same as those in FIG. 11. However, the number of first phase windings 120-1' provided in the first mover iron core 110-1 is ½ of the number of the first phase windings 120-1 in FIG. 11. Similarly, the number of second phase windings 120-2' provided in the second mover iron core 110-2 is ½ of the number of the second phase windings 120-2 in FIG. 11.

The first mover 100-1 includes /U, V, /W, U, /V, and W phases, and the second mover 100-2 includes W, /U, V, /W, U, and /V phases. Although not illustrated, the second phase windings 120-2' of the second mover 100-2 may include /W, U, /V, W, /U, and V phases.

Figure 17:
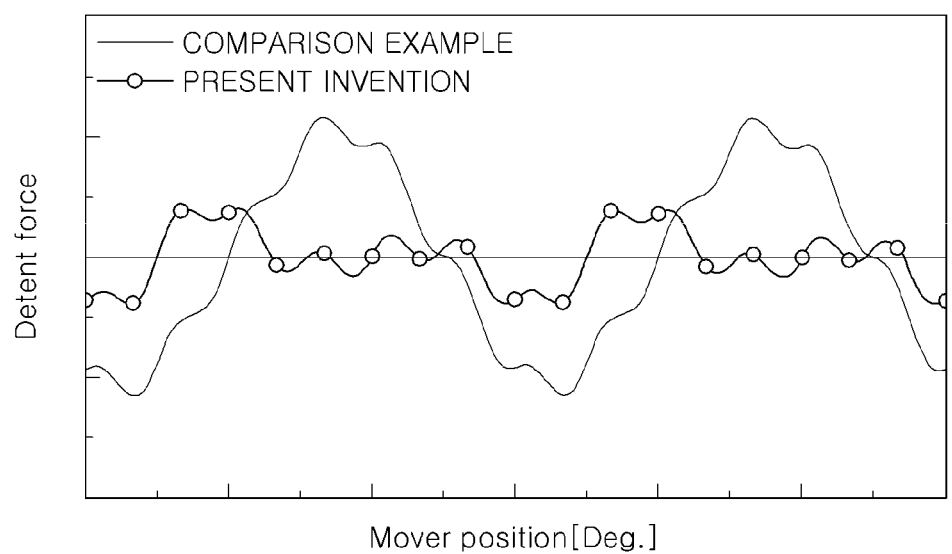
FIG. 17 is a diagram illustrating comparison of detent force with respect to mover position between the permanent magnet electrical machine according to the prior art and the permanent magnet electrical machine according to the present invention.

FIG. 17 is a diagram illustrating comparison of detent force with respect to mover position between the permanent magnet electrical machine in which the movers are continuously connected and the permanent magnet electrical machine according to the present invention.

Referring to FIG. 17, the permanent magnet electrical machine according to the present invention can reduce the detent force up to 65%, as compared with the permanent magnet electrical machine in which the movers are continuously connected.

Figure 18:
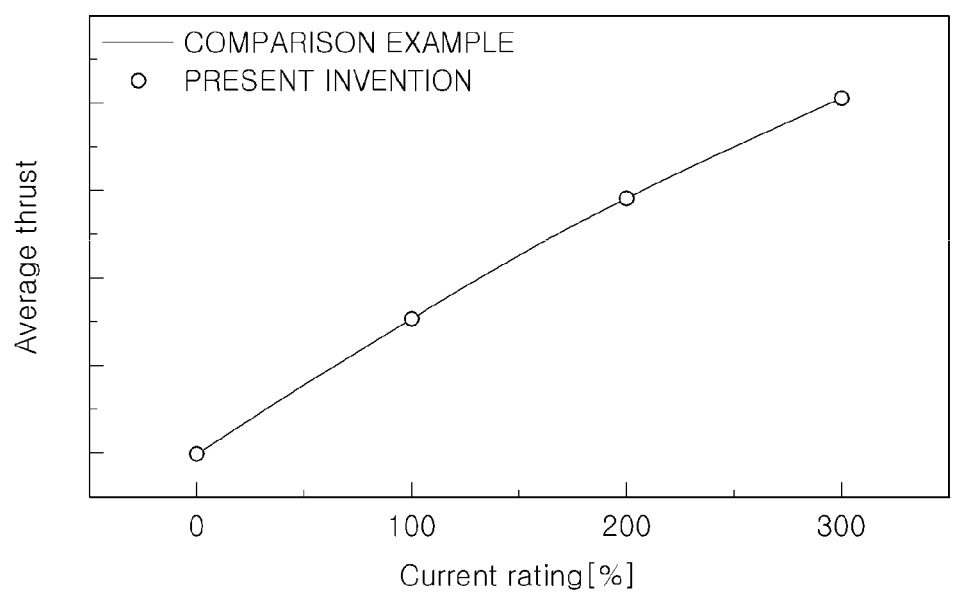
FIG. 18 is a diagram illustrating comparison of average thrust with respect to current rating between the permanent magnet electrical machine according to the prior art and the permanent magnet electrical machine according to the present invention.

FIG. 18 is a diagram illustrating comparison of average thrust with respect to current rating between the permanent magnet electrical machine in which the movers are continuously connected and the permanent magnet electrical machine according to the present invention.

The present invention can reduce the detent force while obtaining the same thrust characteristics as those of the permanent magnet electrical machine in which the movers are continuously connected.

Generally, the detent force consists of a cogging force generated in the slot (or tooth) of the mover and an end force generated at both ends of the mover. A period of the cogging force is determined by a combination of the number of slots and the number of poles, and the cogging force can be effectively reduced by applying the mover or stator skew. However, since the end force is generated by the magnetic interaction between the tooth at the left and right ends of the mover and the permanent magnet, the period is the same as the interval of the magnetic poles.

The mover separation structure proposed in the present invention uses the phase difference of the end force generated in each mover.

For example, in the case of a mover having 10 poles and 12 slots, the end effect of the mover has occurred only in the right and left teeth of the mover. If the mover having 10 poles and 12 slots is separated by two movers having a 5-pole 6-slot structure, a new end effect occurs therein due to the separation distance between the movers.

In other words, by separating the first mover and the second mover, the end force generated in the right and left teeth of the first mover is substantially the same as the end force generated in the right and left teeth of the second mover, and the phase difference therebetween is 180°. With this mover separation arrangement, only the end force of the electrical machine can be effectively removed.

The shortest separation distance that implements this effect is the pole pitch($\tau_p$)/phase number (n) of the electrical machine, which is the weighted value (γ) suggested by the present invention. In principle, it is applicable to an electrical machine having an arbitrary phase. In addition, in principle, the same effect can be obtained by an integral multiple of the separation distance (γ). For example, in case of 5 phases, since the number of teeth of the mover is an integral multiple of 5 and the electrical phase difference of each phase is pole pitch/5, the electrical phase difference is 36°, and the separation distance can be an integral multiple of 36°. When constructing each phase, /phase can also be included. Therefore, the combination of phases can be very diverse.

Figure 19:
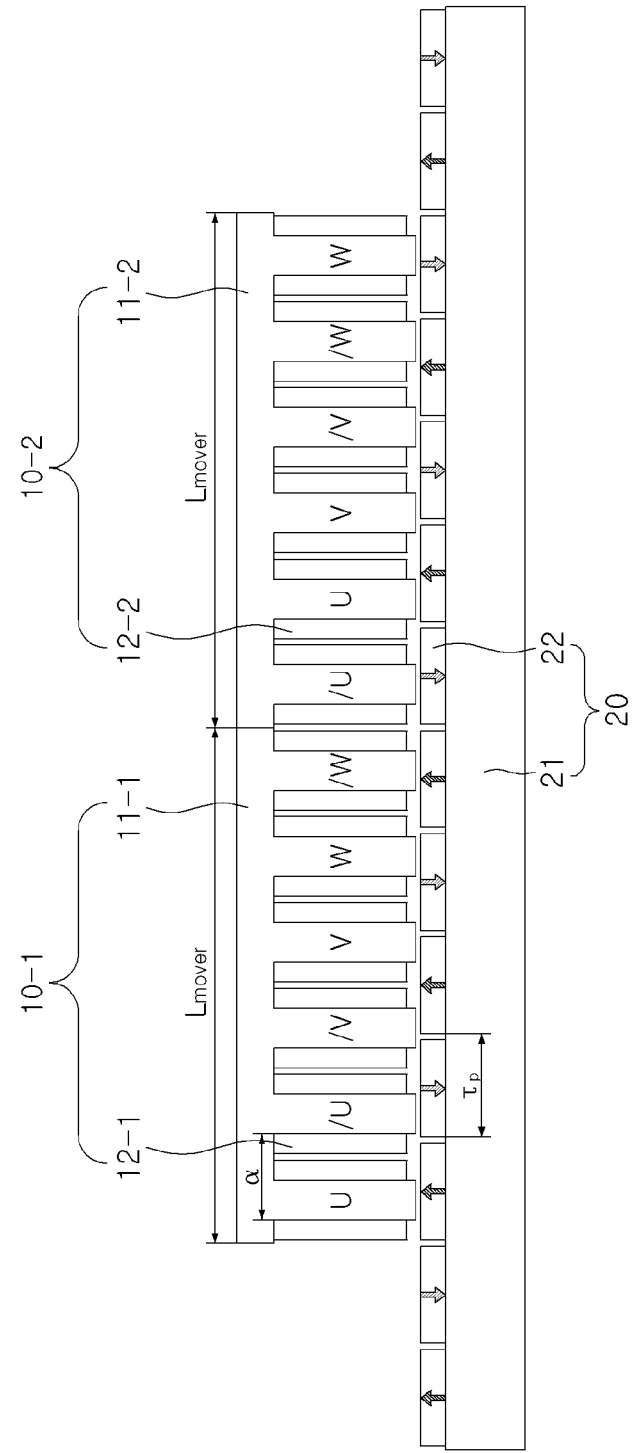
FIG. 19 illustrates a permanent magnet electrical machine having five permanent magnets and six mover slots and driven by a three-phase power source, in which movers of the permanent magnet electrical machine are continuously connected, to be compared with the present invention in FIGS. 17 and 18.
Figure 20:
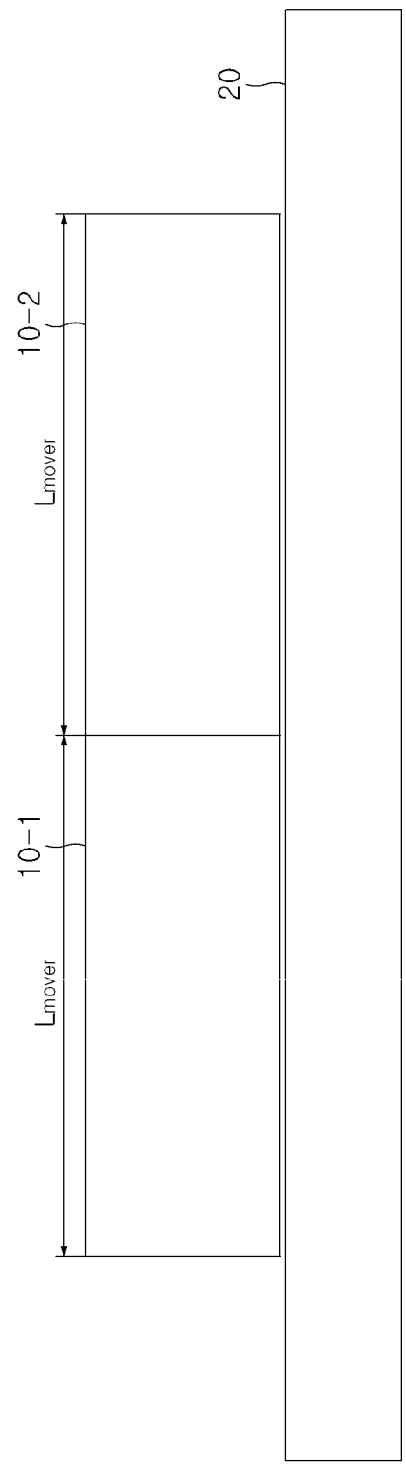
FIG. 20 is a simplified diagram of FIG. 19.

FIG. 19 illustrates a permanent magnet electrical machine having five permanent magnets and six mover slots and driven by a three-phase power source, in which movers are continuously connected, to be compared with the present invention in FIGS. 17 and 18, and FIG. 20 is a simplified diagram of FIG. 19.

Referring to FIGS. 18 and 19, the permanent magnet electrical machine, in which movers are continuously connected, to be compared with the present invention includes a first mover 100-1 having phase windings 12-1 having U, /U, /V, V, W, and W/ phases on a mover iron core 11-1 having teeth of a multiple of 3, a second mover 100-2 having phase windings 120-2 having /U, U, V, /V, /W, and W phases on a second mover iron core 11-2 having teeth of a multiple of 3, and a stator 20 having permanent magnets 22 disposed on a straight stator iron core 21 having no stator teeth and having permanent magnets 22 arranged to have a magnetic polarity opposite to that of an adjacent permanent magnet.

As described above, the permanent magnet electrical machine to be compared with the present invention is based on, for example, the movers 10-1 and 10-2 having the 6-slot structure, and has the movers 10-1 and 10-2 continuously connected without being separated by a predetermined distance. As a result, the permanent magnet electrical machine has a 10-pole 12-slot structure.

At this time, when the pole pitch is $\tau_p$, the length $L_{mover}$ of the mover is $L_{mover}=10\tau_p$, the tooth arrangement interval α Is α=5$\tau_p$/6, the phase arrangement of the first mover 10-1 is U, /U, /V, V, W, and /W, and the upper arrangement of the second mover 10-2 is /U, U, /V, V, /W, and W. Here, U and /U, V and /V, and W and /W have opposite current directions.

As described above, the permanent magnet electrical machine, in which the movers are continuously connected, to be compared with the present invention has the same performance as the permanent magnet electrical machine having the 5-pole 6-slot structure of the present invention, but the pulsation of thrust occurs due to the end effect.

In the above description, the linear motion of the movers has been described as an example, but the present invention is not limited thereto. Therefore, the movers of permanent magnet electrical machine according to the present invention may be configured to perform curvilinear motion or rotary motion.

A permanent magnet electrical machine according to the present invention can reduce a detent force up to 65%, as compared with a permanent magnet electrical machine in which movers are continuously connected. In particular, a permanent magnet electrical machine according to the present invention can reduce a detent force while maintaining the same thrust characteristics, as compared with a permanent magnet electrical machine in which movers are continuously connected.

The spirit of the present invention has been just exemplified. It will be appreciated by those skilled in the art that various modifications, changes, and substitutions can be made without departing from the essential characteristics of the present invention. Accordingly, the exemplary embodiments disclosed in the present invention and the accompanying drawings are used not to limit but to describe the spirit of the present invention. The scope of the present invention is not limited only to the embodiments and the accompanying drawings. The protection scope of the present invention must be interpreted by the appended claims and it should be interpreted that all spirits within a scope equivalent thereto are included in the appended claims of the present invention.

What is claimed is:

1. A permanent magnet electrical machine comprising:
a stator; and
a plurality of movers configured to perform linear motion, curvilinear motion, or rotary motion with respect to the stator, the plurality of movers including a first mover and a second mover,
wherein an interval between a last tooth of the first mover and a first tooth of the second mover adjacent to the first mover is α+γ, wherein α, which is a tooth arrangement interval of a respective mover, the respective mover being each of the first and second movers, is α=m$\tau_p$/s, and γ, which is a weighted value, is γ=$\tau_p$/n, herein m is the number of magnetic poles of the stator with respect to the respective mover, s is the number of teeth of the respective mover, $\tau_p$ is a pole pitch of the stator, and n is the number of phases of the electrical machine,
wherein the respective mover has teeth, which are d times of 3 and are arranged at predetermined intervals, and phase windings wound around the teeth, herein d is a natural number of 2 or more,
wherein the stator includes a plurality of magnetic poles having polarities alternating with respect to a stator iron core, and
wherein when the number m of magnetic poles of the stator is 7 and the number s of teeth of the respective mover is 9, the first mover includes phase windings in the order of U, V, W, /W, /U, /V, V, W, and U phases, and the second mover includes phase windings in the order of W, U, V, /V, /W, /U, U, V, and W phases, wherein U and /U, V and N, and W and /W have different current directions.

2. A permanent magnet electrical machine comprising:
a stator; and
a plurality of movers configured to perform linear motion, curvilinear motion, or rotary motion with respect to the stator, the plurality of movers including a first mover and a second mover,
wherein an interval between a last tooth of the first mover and a first tooth of the second mover adjacent to the first mover is α+γ, wherein α, which is a tooth arrangement interval of a respective mover, the respective mover being each of the first and second movers, is α=m$\tau_p$/s, and γ, which is a weighted value, is γ=$\tau_p$/n, herein m is the number of magnetic poles of the stator with respect to the respective mover, s is the number of teeth of the respective mover, $\tau_p$ is a pole pitch of the stator, and n is the number of phases of the electrical machine,
wherein the respective mover has teeth, which are d times of 3 and are arranged at predetermined intervals, and phase windings wound around the teeth, herein d is a natural number of 2 or more,
wherein the stator includes a plurality of magnetic poles having polarities alternating with respect to a stator iron core, and wherein when the number m of magnetic poles of the stator is 8 and the number s of teeth of the respective mover is 9, the first mover includes phase windings in the order of U, /U, U, V, /V, V, W, /W, and W phases, and the second mover includes phase windings in the order of /W, W, /W, /U, U, /U, /V, V, and /V phases, wherein U and /U, V and /V, and W and /W have different current directions.

3. A permanent magnet electrical machine comprising:
a stator; and
a plurality of movers configured to perform linear motion, curvilinear motion, or rotary motion with respect to the stator, the plurality of movers including a first mover and a second mover,
wherein an interval between a last tooth of the first mover and a first tooth of the second mover adjacent to the first mover is α+γ, wherein α, which is a tooth arrangement interval of a respective mover, the respective mover being each of the first and second movers, is α=mτ$_p$/s, and γ, which is a weighted value, is γ=τ$_p$/n, herein m is the number of magnetic poles of the stator with respect to the respective mover, s is the number of teeth of the respective mover, τ$_p$ is a pole pitch of the stator, and n is the number of phases of the electrical machine,
wherein the respective mover has teeth, which are d times of 3 and are arranged at predetermined intervals, and phase windings wound around the teeth, herein d is a natural number of 2 or more,
wherein the stator includes a plurality of magnetic poles having polarities alternating with respect to a stator iron core, and
wherein when the number m of magnetic poles of the stator is 10 and the number s of teeth of the respective mover is 9, the first mover includes phase windings in the order of U, /U, U, V, /V, V, W, /W, and W phases, and the second mover includes phase windings in the order of /V, V, /V, /W, W, /W, /U, U, and /U phases, wherein U and /U, V and /V, and W and /W have different current directions.

4. A permanent magnet electrical machine comprising:
a stator; and
a plurality of movers configured to perform linear motion, curvilinear motion, or rotary motion with respect to the stator, the plurality of movers including a first mover and a second mover,
wherein an interval between a last tooth of the first mover and a first tooth of the second mover adjacent to the first mover is α+γ, wherein α, which is a tooth arrangement interval of a respective mover, the respective mover being each of the first and second movers, is α=mτ$_p$/s, and γ, which is a weighted value, is γ=τ$_p$/n, herein m is the number of magnetic poles of the stator with respect to the respective mover, s is the number of teeth of the respective mover, τ$_p$ is a pole pitch of the stator, and n is the number of phases of the electrical machine,
wherein the respective mover has teeth, which are d times of 3 and are arranged at predetermined intervals, and phase windings wound around the teeth, herein d is a natural number of 2 or more,
wherein the stator includes a plurality of magnetic poles having polarities alternating with respect to a stator iron core, and
wherein when the number m of magnetic poles of the stator is 11 and the number s of teeth of the respective mover is 12, the first mover includes phase windings in the order of U, /U, U, /U, /V, V, /V, V, W, /W, W, and /W phases, and the second mover includes phase windings in the order of W, /W, W, /W, /U, U, /U, U, V, /V, V, and /V phases, wherein U and /U, V and /V, and W and /W have different current directions.

5. A permanent magnet electrical machine comprising:
a stator; and
a plurality of movers configured to perform linear motion, curvilinear motion, or rotary motion with respect to the stator, the plurality of movers including a first mover and a second mover,
wherein an interval between a last tooth of the first mover and a first tooth of the second mover adjacent to the first mover is α+γ, wherein α, which is a tooth arrangement interval of a respective mover, the respective mover being each of the first and second movers, is α=mτ$_p$/s, and γ, which is a weighted value, is γ=τ$_p$/n, herein m is the number of magnetic poles of the stator with respect to the respective mover, s is the number of teeth of the respective mover, τ$_p$ is a pole pitch of the stator, and n is the number of phases of the electrical machine,
wherein the respective mover has teeth, which are d times of 3 and are arranged at predetermined intervals, and phase windings wound around the teeth, herein d is a natural number of 2 or more,
wherein the stator includes a plurality of magnetic poles having polarities alternating with respect to a stator iron core, and
wherein when the number m of magnetic poles of the stator is 13 and the number s of teeth of the respective mover is 12, the first mover includes phase windings in the order of U, /U, U, /U, /V, V, /V, V, W, /W, W, and /W phases, and the second mover includes phase windings in the order of V, /V, V, /V, /W, W, /W, W, U, /U, U, and /U phases, wherein U and /U, V and /V, and W and /W have different current directions.

6. A permanent magnet electrical machine comprising:
a stator; and
a plurality of movers configured to perform linear motion, curvilinear motion, or rotary motion with respect to the stator, the plurality of movers including a first mover and a second mover,
wherein an interval between a last tooth of the first mover and a first tooth of the second mover adjacent to the first mover is α+γ, wherein α, which is a tooth arrangement interval of a respective mover, the respective mover being each of the first and second movers, is α=mτ$_p$/s, and γ, which is a weighted value, is γ=τ$_p$/n, herein m is the number of magnetic poles of the stator with respect to the respective mover, s is the number of teeth of the respective mover, τ$_p$ is a pole pitch of the stator, and n is the number of phases of the electrical machine,
wherein the respective mover has teeth, which are d times of 3 and are arranged at predetermined intervals, and phase windings wound around the teeth, herein d is a natural number of 2 or more,
wherein the stator includes a plurality of magnetic poles having polarities alternating with respect to a stator iron core, and
wherein when the number m of magnetic poles of the stator is 10 and the number s of teeth of the respective mover is 12, the first mover includes phase windings in the order of U, /U, /V, V, W, /W, /U, U, V, N, /W, and W phases, and the second mover includes phase windings in the order of /W, W, U, /U, /V, V, W, /W, /U, U, V, and /V phases, wherein U and /U, V and /V, and W and /W have different current directions.

7. A permanent magnet electrical machine comprising:
a stator; and a plurality of movers configured to perform linear motion, curvilinear motion, or rotary motion with respect to the stator, the plurality of movers including a first mover and a second mover, wherein an interval between a last tooth of the first mover and a first tooth of the second mover adjacent to the first mover is $\alpha+\gamma$, wherein $\alpha$, which is a tooth arrangement interval of a respective mover, the respective mover being each of the first and second movers, is $\alpha=m\tau_p/s$, and $\gamma$, which is a weighted value, is $\gamma=\tau_p/n$, herein m is the number of magnetic poles of the stator with respect to the respective mover, s is the number of teeth of the respective mover, $\tau_p$ is a pole pitch of the stator, and n is the number of phases of the electrical machine, wherein the respective mover has teeth, which are d times of 3 and are arranged at predetermined intervals, and phase windings alternately wound around the teeth, herein d is a multiple of 2, and p=t/2 where the number of teeth is t and the number of phase windings is p, wherein the stator includes a plurality of magnetic poles having polarities alternating with respect to a stator iron core, and wherein when the number m of magnetic poles of the stator is 5 and the number s of teeth of the respective mover is 6, the first mover includes phase windings in the order of /U, V, and /W phases, and the second mover includes phase windings in the order of /W, U, and /V phases or phase windings in the order of W, /U, and V phases, wherein U and /U, V and /V, and W and /W have different current directions.

8. A permanent magnet electrical machine comprising:
a stator; and
a plurality of movers configured to perform linear motion, curvilinear motion, or rotary motion with respect to the stator, the plurality of movers including a first mover and a second mover, wherein an interval between a last tooth of the first mover and a first tooth of the second mover adjacent to the first mover is $\alpha+\gamma$, wherein $\alpha$, which is a tooth arrangement interval of a respective mover, the respective mover being each of the first and second movers, is $\alpha=m\tau_p/s$, and $\gamma$, which is a weighted value, is $\gamma=\tau_p/n$, herein m is the number of magnetic poles of the stator with respect to the respective mover, s is the number of teeth of the respective mover, $\tau_p$ is a pole pitch of the stator, and n is the number of phases of the electrical machine, wherein the respective mover has teeth, which are d times of 3 and are arranged at predetermined intervals, and phase windings alternately wound around the teeth, herein d is a multiple of 2, and p=t/2 where the number of teeth is t and the number of phase windings is p, wherein the stator includes a plurality of magnetic poles having polarities alternating with respect to a stator iron core, and wherein when the number m of magnetic poles of the stator is 7 and the number s of teeth of the respective mover is 6, the first mover includes phase windings in the order of /U, V, and /W phases, and the second mover includes phase windings in the order of /V, W, and /U phases or phase windings in the order of V, /W, and U phases, wherein U and /U, V and /V, and W and /W have different current directions.

9. A permanent magnet electrical machine comprising:
a stator; and a plurality of movers configured to perform linear motion, curvilinear motion, or rotary motion with respect to the stator, the plurality of movers including a first mover and a second mover, wherein an interval between a last tooth of the first mover and a first tooth of the second mover adjacent to the first mover is $\alpha+\gamma$, wherein $\alpha$, which is a tooth arrangement interval of a respective mover, the respective mover being each of the first and second movers, is $\alpha=m\tau_p/s$, and $\gamma$, which is a weighted value, is $\gamma=\tau_p/n$, herein m is the number of magnetic poles of the stator with respect to the respective mover, s is the number of teeth of the respective mover, $\tau_p$ is a pole pitch of the stator, and n is the number of phases of the electrical machine, wherein the respective mover has teeth, which are d times of 3 and are arranged at predetermined intervals, and phase windings alternately wound around the teeth, herein d is a multiple of 2, and p=t/2 where the number of teeth is t and the number of phase windings is p, wherein the stator includes a plurality of magnetic poles having polarities alternating with respect to a stator iron core, and wherein when the number m of magnetic poles of the stator is 11 and the number s of teeth of the respective mover is 12, the first mover includes phase windings in the order of /U, /U, V, V, /W, and /W phases, and the second mover includes phase windings in the order of /W, /W, U, U, /V, and N phases or phase windings in the order of W, W, /U, /U, V, and V phases, wherein U and /U, V and /V, and W and /W have different current directions.

10. A permanent magnet electrical machine comprising:
a stator; and
a plurality of movers configured to perform linear motion, curvilinear motion, or rotary motion with respect to the stator, the plurality of movers including a first mover and a second mover, wherein an interval between a last tooth of the first mover and a first tooth of the second mover adjacent to the first mover is $\alpha+\gamma$, wherein $\alpha$, which is a tooth arrangement interval of a respective mover, the respective mover being each of the first and second movers, is $\alpha=m\tau_p/s$, and $\gamma$, which is a weighted value, is $\gamma=\tau_p/n$, herein m is the number of magnetic poles of the stator with respect to the respective mover, s is the number of teeth of the respective mover, $\tau_p$ is a pole pitch of the stator, and n is the number of phases of the electrical machine, wherein the respective mover has teeth, which are d times of 3 and are arranged at predetermined intervals, and phase windings alternately wound around the teeth, herein d is a multiple of 2, and p=t/2 where the number of teeth is t and the number of phase windings is p, wherein the stator includes a plurality of magnetic poles having polarities alternating with respect to a stator iron core, and wherein when the number m of magnetic poles of the stator is 13 and the number s of teeth of the respective mover is 12, the first mover includes phase windings in the order of /U, /U, V, V, /W, and /W phases, and phase windings of the second mover includes phase windings in the order of /V, /V, W, W, /U, and /U phase or phase windings in the order of V, V, /W, /W, U, and U phases, wherein U and /U, V and /V, and W and /W have different current directions.

11. A permanent magnet electrical machine comprising:
a stator; and a plurality of movers configured to perform linear motion, curvilinear motion, or rotary motion with respect to the stator, the plurality of movers including a first mover and a second mover, wherein an interval between a last tooth of the first mover and a first tooth of the second mover adjacent to the first mover is α+γ, wherein α, which is a tooth arrangement interval of a respective mover, the respective mover being each of the first and second movers, is $\alpha = m\tau_p/s$, and γ, which is a weighted value, is $\gamma = \tau_p/n$, herein m is the number of magnetic poles of the stator with respect to the respective mover, s is the number of teeth of the respective mover, $\tau_p$ is a pole pitch of the stator, and n is the number of phases of the electrical machine, wherein the respective mover has teeth, which are d times of 3 and are arranged at predetermined intervals, and phase windings alternately wound around the teeth, herein d is a multiple of 2, and p=t/2 where the number of teeth is t and the number of phase windings is p, wherein the stator includes a plurality of magnetic poles having polarities alternating with respect to a stator iron core, and wherein when the number m of magnetic poles of the stator is 10 and the number s of teeth of the respective mover is 12, the first mover includes phase windings in the order of /U, V, /W, U, /V, and W phases, and the second mover includes phase windings in the order of W, /U, V, /W, U, and /V phases or phase windings in the order of /W, U, /V, W, /U, and V phases, wherein U and /U, V and /V, and W and /W have different current directions.

12. A permanent magnet electrical machine comprising:
a stator; and
a plurality of movers configured to perform linear motion, curvilinear motion, or rotary motion with respect to the stator, the plurality of movers including a first mover and a second mover, wherein an interval between a last tooth of the first mover and a first tooth of the second mover adjacent to the first mover is α+γ, wherein α, which is a tooth arrangement interval of a respective mover, the respective mover being each of the first and second movers, is $\alpha = m\tau_p/s$, and γ, which is a weighted value, is $\gamma = \tau_p/n$, herein m is the number of magnetic poles of the stator with respect to the respective mover, s is the number of teeth of the respective mover, $\tau_p$ is a pole pitch of the stator, and n is the number of phases of the electrical machine, wherein the respective mover has teeth, which are d times of 3 and are arranged at predetermined intervals, and phase windings wound around the teeth, herein d is a natural number of 2 or more, wherein the stator includes a plurality of magnetic poles having polarities alternating with respect to a stator iron core, and wherein when the number m of magnetic poles of the stator is 5 and the number s of teeth of the respective mover is 6, the first mover includes phase windings in the order of U, /U, /V, V, W, and /W phases, and the second mover includes phase windings in the order of W, /W, /U, U, V, and /V phases, wherein U and /U, V and /V, and W and /W have different current directions.

13. A permanent magnet electrical machine comprising:
a stator; and
a plurality of movers configured to perform linear motion, curvilinear motion, or rotary motion with respect to the stator, the plurality of movers including a first mover and a second mover, wherein an interval between a last tooth of the first mover and a first tooth of the second mover adjacent to the first mover is α+γ, wherein α, which is a tooth arrangement interval of a respective mover, the respective mover being each of the first and second movers, is $\alpha = m\tau_p/s$, and γ, which is a weighted value, is $\gamma = \tau_p/n$, herein m is the number of magnetic poles of the stator with respect to the respective mover, s is the number of teeth of the respective mover, $\tau_p$ is a pole pitch of the stator, and n is the number of phases of the electrical machine, wherein the respective mover has teeth, which are d times of 3 and are arranged at predetermined intervals, and phase windings wound around the teeth, herein d is a natural number of 2 or more, wherein the stator includes a plurality of magnetic poles having polarities alternating with respect to a stator iron core, and wherein when the number m of magnetic poles of the stator is 7 and the number s of teeth of the respective mover is 6, the first mover includes phase windings in the order of U, /U, /V, V, W, and /W phases, and the second mover includes phase windings in the order of V, /V, /W, W, U, and /U phases, wherein U and /U, V and /V, and W and /W have different current directions.

* * * * *